US010422179B2

(12) United States Patent
Goldfinch et al.

(10) Patent No.: US 10,422,179 B2
(45) Date of Patent: Sep. 24, 2019

(54) PANEL FRAME ASSEMBLY, PROCESSING, TRANSPORT, AND INSTALLATION SYSTEM

(71) Applicant: Goldfinch Brothers Inc., Everett, WA (US)

(72) Inventors: Gregory James Goldfinch, Everett, WA (US); Kurt Danby Willows, Everett, WA (US); Ilcho Ivanov Lodarski, Mukilteo, WA (US); Kevin Layne Bontrager, Everett, WA (US); Robert Allen Larson, Jr., Everett, WA (US)

(73) Assignee: Goldfinch Brothers Inc., Everett, WA (US)

( * ) Notice: Subject to any disclaimer, the term of this patent is extended or adjusted under 35 U.S.C. 154(b) by 0 days.

(21) Appl. No.: 15/955,060

(22) Filed: Apr. 17, 2018

(65) Prior Publication Data

US 2018/0298676 A1 Oct. 18, 2018

Related U.S. Application Data

(60) Provisional application No. 62/486,821, filed on Apr. 18, 2017.

(51) Int. Cl.
| | |
|---|---|
| *E06B 7/00* | (2006.01) |
| *B60P 7/06* | (2006.01) |
| *E06B 3/04* | (2006.01) |
| *E06B 3/673* | (2006.01) |

(Continued)

(52) U.S. Cl.
CPC ............ *E06B 7/00* (2013.01); *B60P 7/06* (2013.01); *E06B 3/04* (2013.01); *E06B 3/673* (2013.01); *E06B 3/67365* (2013.01); *E06B 3/67373* (2013.01); *B60P 3/002* (2013.01); *E06B 3/5427* (2013.01)

(58) Field of Classification Search
CPC .......... E06B 7/00; E06B 3/04; E06B 3/67365; B60P 3/002; B60P 7/06; B60P 7/10; B65D 19/44; B65D 85/48; B65G 49/062; B65G 1/00; B65G 67/04; A47B 53/02
USPC ... 211/41.14, 41.15, 41.16, 162, 94.01, 59.4, 211/150; 118/500, 503; 410/32–35; 248/288.11, 291.1, 441.1; 206/454, 448, 206/321

See application file for complete search history.

(56) References Cited

U.S. PATENT DOCUMENTS

| | | | | |
|---|---|---|---|---|
| 2,940,402 A | * | 6/1960 | Hansen | ............... B61D 3/16 |
| | | | | 211/41.14 |
| 2,950,541 A | * | 8/1960 | Gridley | ............... F26B 25/18 |
| | | | | 211/150 |

(Continued)

*Primary Examiner* — Jennifer E. Novosad
(74) *Attorney, Agent, or Firm* — Seed Intellectual Property Law Group LLP

(57) ABSTRACT

A panel support and panel processing system that provides a single frame assembly for use on a panel processing line in transporting and installing panels, such as glass panels, the frame assembly having a frame with at least one hook that engages a carrier on a processing line to move the frame from one station to the next, and that enables lifting and stacking of multiple frames for transport to and installation at a building site without having to remove the panel, such as a glass panel, from the frame, at which point the frame and panel assembly are secured in situ.

11 Claims, 22 Drawing Sheets

(51) Int. Cl.
*B60P 3/00* (2006.01)
*E06B 3/54* (2006.01)

(56) References Cited

U.S. PATENT DOCUMENTS

| | | | | |
|---|---|---|---|---|
| 3,143,087 A * | 8/1964 | Rodder | ............... | B01L 9/00 108/116 |
| 3,193,093 A * | 7/1965 | Hansen | ............... | B65G 49/062 108/53.1 |
| 3,301,405 A * | 1/1967 | Turney | ............... | B65G 49/062 211/41.14 |
| 3,762,572 A * | 10/1973 | Hager | ............... | A47F 7/04 108/2 |
| 3,893,705 A * | 7/1975 | Allen | ............... | B60P 3/002 410/32 |
| 3,955,676 A * | 5/1976 | Hansen | ............... | B65D 85/48 206/451 |
| 4,161,017 A * | 7/1979 | Pierce | ............... | H05K 7/1417 16/266 |
| 4,200,195 A * | 4/1980 | Hager | ............... | B62B 3/006 108/177 |
| 4,360,298 A * | 11/1982 | Fischer | ............... | B60P 3/002 206/451 |
| 4,559,001 A * | 12/1985 | Wiedenhofer | ...... | E06B 3/67365 156/107 |
| 5,145,073 A * | 9/1992 | Kitagawa | ............... | B65D 85/48 206/448 |
| 5,244,104 A * | 9/1993 | Green | ............... | F26B 25/18 211/150 |
| 5,505,574 A * | 4/1996 | Piazza | ............... | A47B 53/02 211/162 |
| 5,641,076 A * | 6/1997 | Englund | ............... | B65D 85/48 206/454 |
| 5,755,339 A * | 5/1998 | Belanger | ............... | B60P 3/002 211/41.14 |
| 5,906,282 A * | 5/1999 | Aldrich | ............... | B65G 49/062 206/454 |
| 5,938,051 A * | 8/1999 | Scholler | ............... | B65G 1/14 211/150 |
| 6,705,476 B2 * | 3/2004 | Linder | ............... | B65D 19/44 211/150 |
| 7,270,236 B2 * | 9/2007 | Angeletti | ............... | B65D 19/44 206/448 |
| 8,967,943 B2 * | 3/2015 | Drott | ............... | B60P 3/41 211/41.14 |
| 2004/0238465 A1 * | 12/2004 | Mercure | ............... | A47B 81/00 211/41.14 |
| 2007/0152544 A1 * | 7/2007 | Strobel | ............... | B65G 1/14 312/9.58 |
| 2010/0258514 A1 * | 10/2010 | Goltz | ............... | B65G 1/02 211/59.4 |
| 2011/0100938 A1 * | 5/2011 | Scadden | ............... | F26B 9/10 211/59.4 |
| 2011/0220598 A1 * | 9/2011 | Flossmann | ............... | F24S 21/00 211/59.4 |
| 2014/0360552 A1 * | 12/2014 | Britcher | ............... | H02S 20/00 136/244 |
| 2018/0298676 A1 * | 10/2018 | Goldfinch | ............... | E06B 7/00 |

* cited by examiner

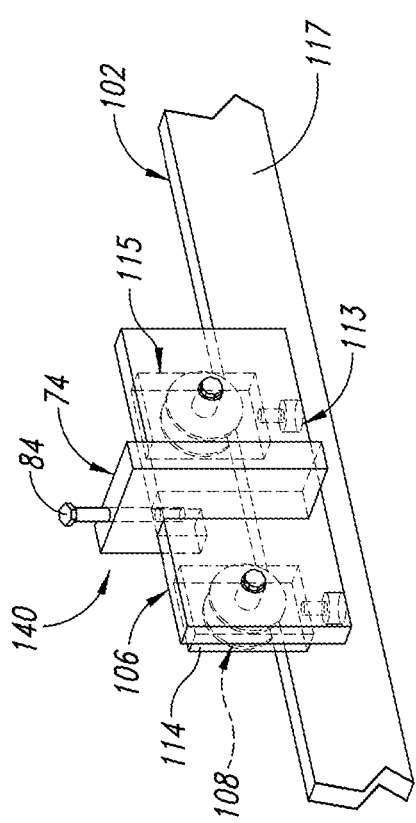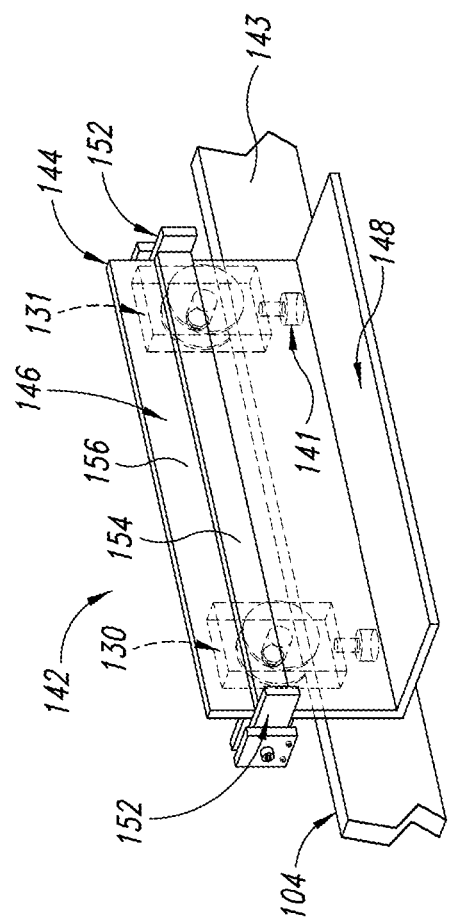

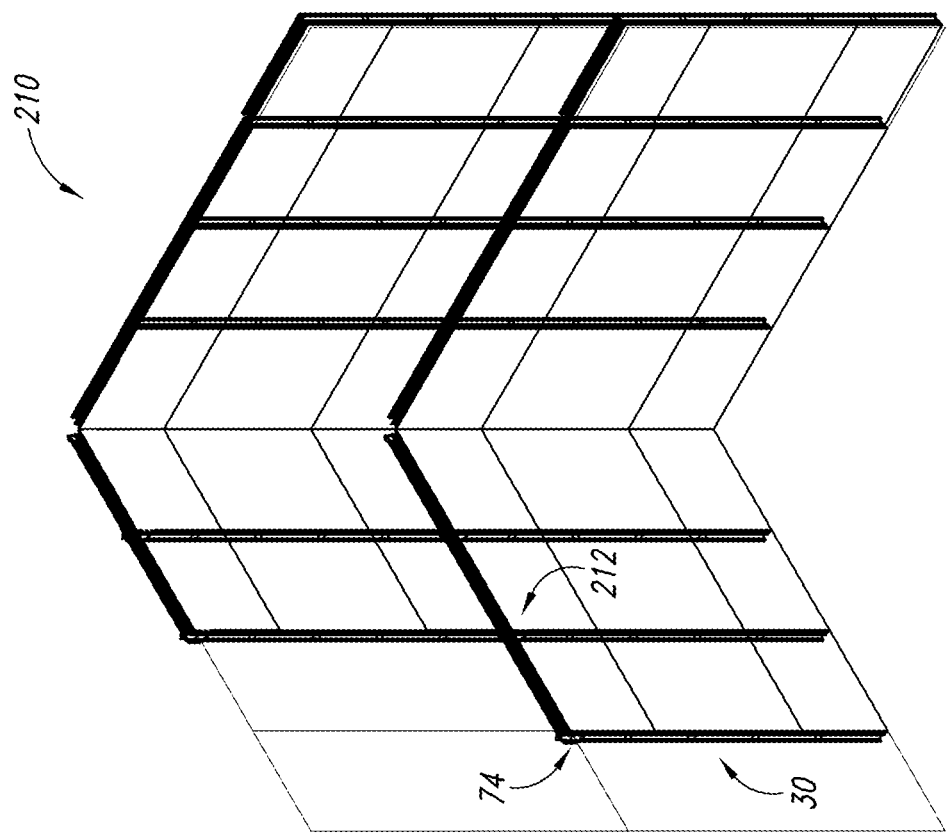
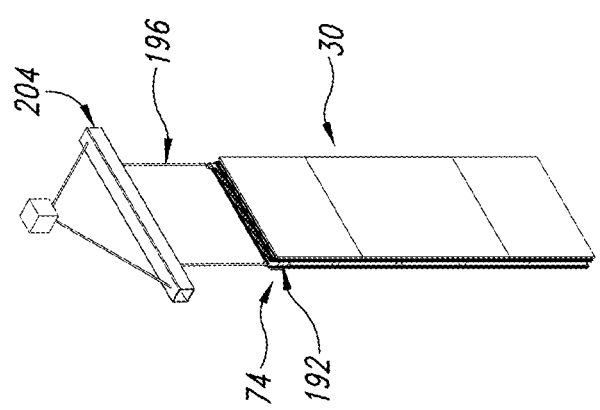
FIG. 16

PANEL FRAME ASSEMBLY, PROCESSING, TRANSPORT, AND INSTALLATION SYSTEM

BACKGROUND

Technical Field

The present disclosure pertains to the manufacture, transport, and installation of panels and, more particularly to a panel support system having a panel frame assembly designed to hold a panel in a vertical or near vertical orientation during processing, then stacked horizontally for transport of the processed panel, and placed into position at a final installation site to minimize handling of the panel frame assembly.

Description of the Related Art

The manufacture, transport, and installation of panels for commercial and residential structures, particularly glass panels, requires a substantial amount of square footage (floor space or footprint) in glazing facilities. The labor intensive nature of traditional wet caulk glazing on large unitized panel assemblies combined with the straight line flow during manufacture is traditionally difficult with such large assemblies in moderately small facilities. In addition to space requirements, there are human factor issues. For example, the assembly of traditional unitized panels is difficult when working and "craning" across such a large surface area without climbing under or over the panel that is being worked on. Traditional horizontal assembly requires the panel to be "flipped" so that both the back pan and glazing sides can be worked on. Given the size of these unitized assemblies and the lack of a suitable way to move them from one assembly station to the next assembly station with traditional horizontal glazing methods, glass movement and setting can be similarly difficult. This is particularly true when the size and position of the glass units outreach that of humans, making for awkward and difficult ergonomics.

Moreover, because glazed assemblies are shipped in either a horizontal pile stack or upright on an incline, these very large "super-assemblies" (14'-16' tall) cannot be shipped upright on an A-Rack because the over-the-road-assembly would be too tall to pass under overpasses and bridges without catastrophic result. The size of these panels and their fragility necessitates the use of pneumatic glass cups for logistical movement of the glazed panels within the production environment. These cups are very durable and standardized, but the process of rotating 750-2,000 pound panels hanging from the glass and tape interface (through 90 degrees) is not always straightforward and is still considered to be a bit of an art. This process of lifting and rotation may also put the "very high bond structural glazing tape" holding each of the glass units in place under transitional shear stress that, depending on the product, may fall outside of the tape's recommended design envelope.

Once the panel assembly has been completed it is typically stored in a pile stack or a leaning stack for later shipment to the job site. When it comes time to ship these finished goods, they are typically shipped in either the horizontal pile stack or upright on an incline (stacked on their side) on the A-Rack. With the traditional approach, the panels need to be shipped in a (90 degrees out) position on an A-Rack or pile and then rotated once on the job site to get into their "on building" orientation before they can be lifted up and assembled onto the building. This series of steps requires extra logistical effort and risk, and is likewise not a desirable approach.

BRIEF SUMMARY

The present disclosure provides a panel frame and panel processing system that facilitates attachment of the panel to a frame and to facilitate handling of the frame throughout manufacture, storage, transport, and installation.

In accordance with one aspect of the present disclosure, a panel processing system for flat panels is provided. The processing system includes a stationary linear support structure having upper and lower horizontal rails supported in an upright angled orientation by vertical support members, a frame assembly that includes an exterior frame that includes a top transverse frame member having opposing first and second ends, a bottom transverse frame member having opposing first and second ends and oriented substantially parallel to the top transverse frame member, a first side frame member having opposing first and second ends attached respectively to the first ends of the top and bottom transverse frame members, and a second side frame member having opposing first and second ends attached respectively to the second ends of the top and bottom transverse frame members and oriented substantially parallel to the first side member to form a substantially rectangular shape, with a first hook attached adjacent to the first end of the first side frame member, and a second hook attached adjacent to the first end of the second side frame member. The system includes a carrier assembly that includes at least one upper carrier and one lower carrier to move on the upper rail and the lower rail respectively, the at least one upper carrier configured to receive one or both of the first and second hooks to support the frame assembly on the stationary support structure, and the at least one lower carrier structured to support the bottom transverse frame member, the at least one upper and lower carriers mounted on the respective upper and lower rails to enable movement of the frame assembly along the support structure in first and second opposing horizontal directions.

In accordance with a further aspect of the present disclosure, a flat panel transport and installation system for use with a lifting device is provided. The system includes a stationary support structure having upper and lower horizontal rails supported in a horizontal orientation by vertical support members, a frame assembly structured to hold the flat panel, the frame assembly having: an exterior frame that includes a top transverse frame member having opposing first and second ends, a bottom transverse frame member having opposing first and second ends and oriented substantially parallel to the top transverse frame member, a first side frame member having opposing first and second ends attached respectively to the first ends of the top and bottom transverse frame members, and a second side frame member having opposing first and second ends attached respectively to the second ends of the top and bottom transverse frame members and oriented substantially parallel to the first side member to form a substantially rectangular shape; a first hook attached adjacent to the first end of the first side frame member; a second hook attached adjacent to the first end of the second side frame member; a first spigot device attached to the second end of the first side frame member and a second spigot device attached at the second end of the second side frame member, each of the first and second spigot devices comprising an attachment point structured for releasable attachment to the lifting device, each spigot device further including a distal end structured to be engaged with at least one lower horizontal rail of the lower horizontal rails; and a pivot cradle assembly that is sized and shaped to attach to the bottom transverse frame member of the frame assembly, the cradle assembly including a longitudinal L-shaped cradle having opposing ends and first and second pivot bars attached at a respective opposing end, the first and second pivot bars structured to engage a vertically adjacent pivot bar when multiple frame assemblies are in a stacked relationship and to permit pivoting of a top frame assembly relative to a lower frame assembly of the multiple frame assemblies when a top frame assembly is lifted by the lifting device attached to the first and second spigot devices of the top frame assembly.

In accordance with still yet a further aspect of the present disclosure, each pivot bar has a first plate that is attached to a respective end of the pivot cradle and a post extending perpendicularly from the first plate in a direction away from the cradle, a second plate formed to have a U-shaped yoke at a distal end that defines an elongate opening that opens at the distal end, the opening being sized and shaped to receive the post from an adjacent pivot bar in slidable engagement, the second plate being attached to the first plate by an intermediate plate, the intermediate plate being angled with respect to the first and second plates so that the second plate is offset from the first plate in spaced parallel relationship.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein:

FIG. 6 is an enlarged isometric view of a carrier assembly mounted on the horizontal processing line in accordance with the present disclosure;

FIG. 7 is an enlarged isometric view of a lower carrier assembly mounted on the horizontal processing line in accordance with the present disclosure;

FIG. 16 is an isometric view of the frame assembly with panels being installed at an installation site;

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures or components or both associated with the use of panels, glass panels, glazing processes, lifting and crane systems, and installation processes have not been shown or described in order to avoid unnecessarily obscuring descriptions of the implementations.

Unless the context requires otherwise, throughout the specification and claims that follow, the word "comprise" and variations thereof, such as "comprises" and "comprising," are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation. Furthermore, the particular features, structures, or characteristics may be combined in any suitable manner in one or more implementations.

Figure 1:
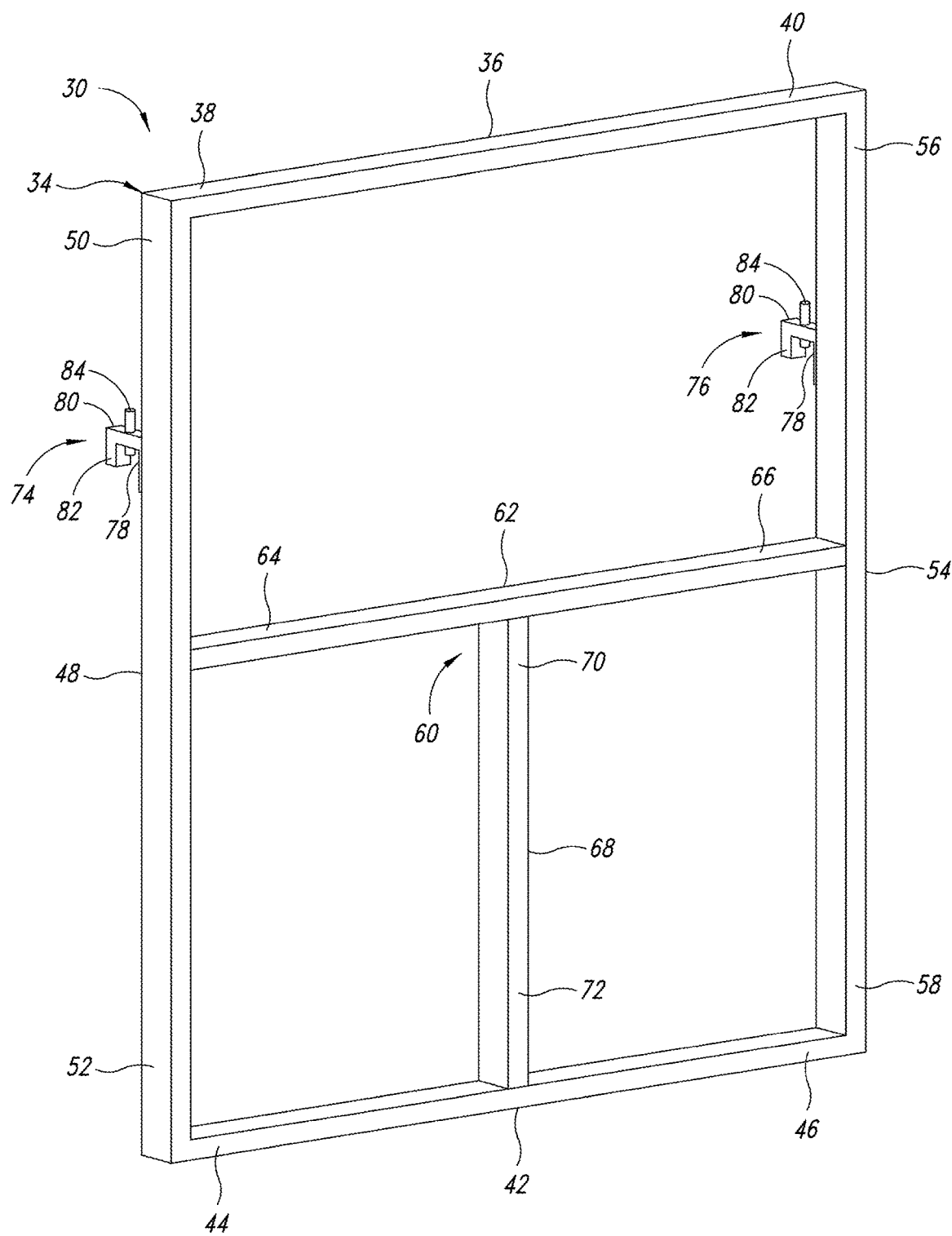
FIG. 1 is an isometric front view of a frame that holds a panel formed in accordance with the present disclosure.
Figure 2:
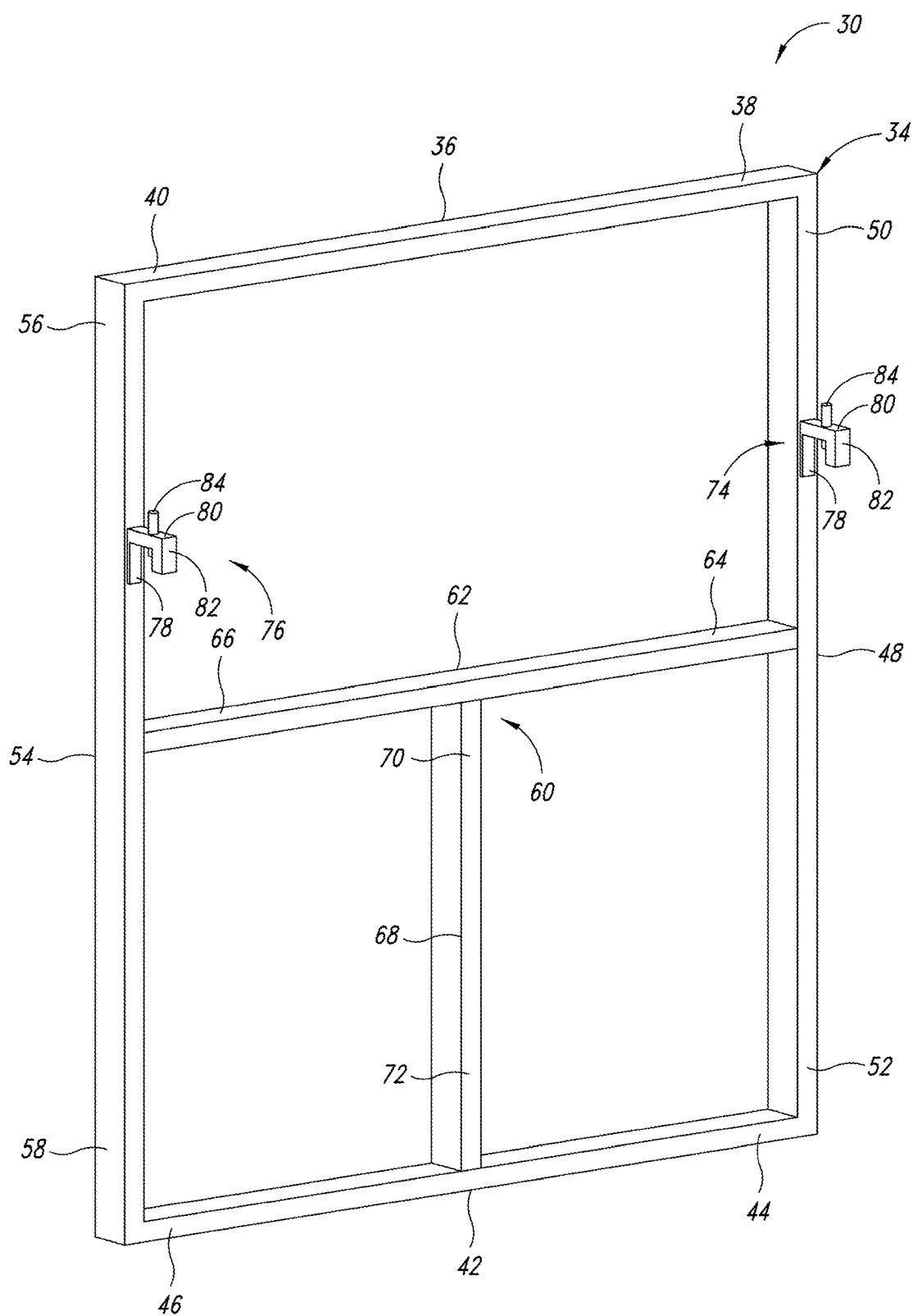
FIG. 2 is an isometric rear view of the frame of FIG. 1.
Figure 3:
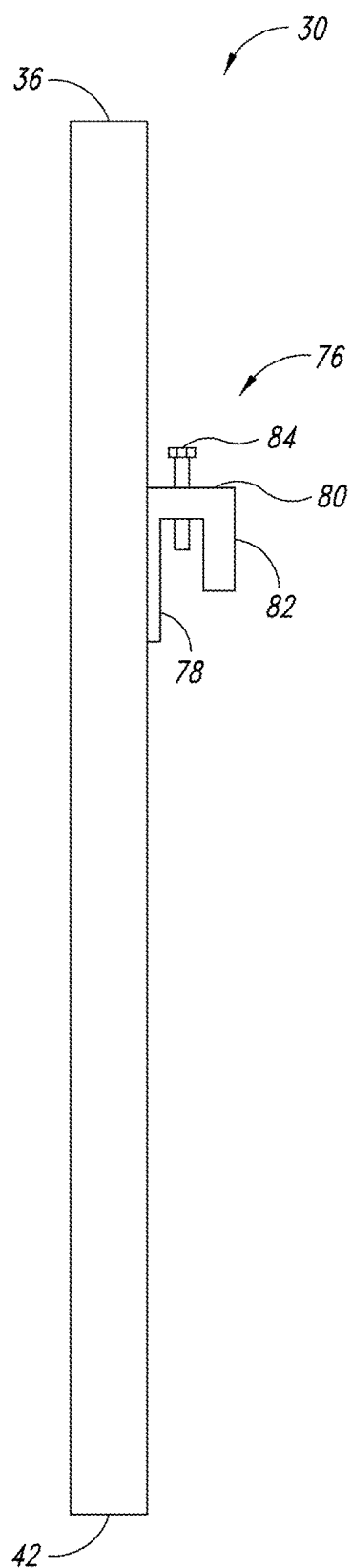
FIG. 3 is a right side view of the frame of FIG. 1 holding a panel.

Referring initially to FIGS. 1-3, shown therein is a frame assembly 30 that is designed to hold, transport, and attach a panel 32 to a plurality of support structures as described more fully herein. The frame assembly 30 includes an exterior frame 34 that includes a top transverse frame member 36 having opposing first and second ends 38, 40, respectively, a bottom transverse frame member 42 having opposing first and second ends 44, 46, respectively. The top and bottom transverse frame members 36, 42 are oriented substantially parallel to one another. The frame assembly 30 further includes a first side frame member 48 having opposing first and second ends 50, 52 respectively, that are attached respectively to the first ends 38, 44 of the top and bottom transverse frame members 36, 42, respectively, and a second side frame member 54 having opposing first and second ends 56, 58 attached to the second ends 40, 46 of the top and bottom transverse frame members 36, 42, respectively, and oriented substantially parallel to the first side member 48 to form a substantially rectangular shape.

In a preferred representative implementation of the present disclosure, the frame assembly 30 further includes a T-shaped interior frame 60 that includes a cross piece 62 having opposing first and second ends 64, 66 attached to the first and second side frame members 48, 54, respectively, and a longitudinal center piece 68 having opposing first and second ends 70, 72 attached respectively to the cross piece 62 and the bottom transverse frame member 42.

A first hook 74 is attached adjacent to the first end 50 of the first side frame member 48, and a second hook 76 is attached adjacent to the first end 56 of the second side frame member 54. Ideally, the first and second hooks 74, 76 have one of either a J shape or a U shape when viewed in side elevation. Each hook 74, 76 has a first segment 78 that is attached to the frame assembly 30, a second segment 80 extending away from the first segment 78, substantially at a right angle, and a third segment 82 depending at substantially a right angle from the second segment and to be substantially parallel to the first segment 78. The first and third segments 78, 82 depend from the second segment 80 in the same direction, thus forming either a substantially J-shaped hook when the third segment 82 is shorter in length than the first segment 78, and a U-shaped hook when the first and third segments 78, 82 are substantially the same length, i.e., they depend the same distance from the second segment 80, all when viewed in a side elevation.

A threaded post 84 extends through an opening (not shown) in the second (transverse) segment 80 of each of the first and second hooks 74, 76 to bear against a supporting structure on which the hooks 74, 76, rest and enable adjustment in the position of the frame assembly 30 and panel 32 relative to the supporting structure as described more fully below. FIG. 3 is a right side elevational view of the frame assembly 30 without the panel 32 mounted thereon.

Figure 4:
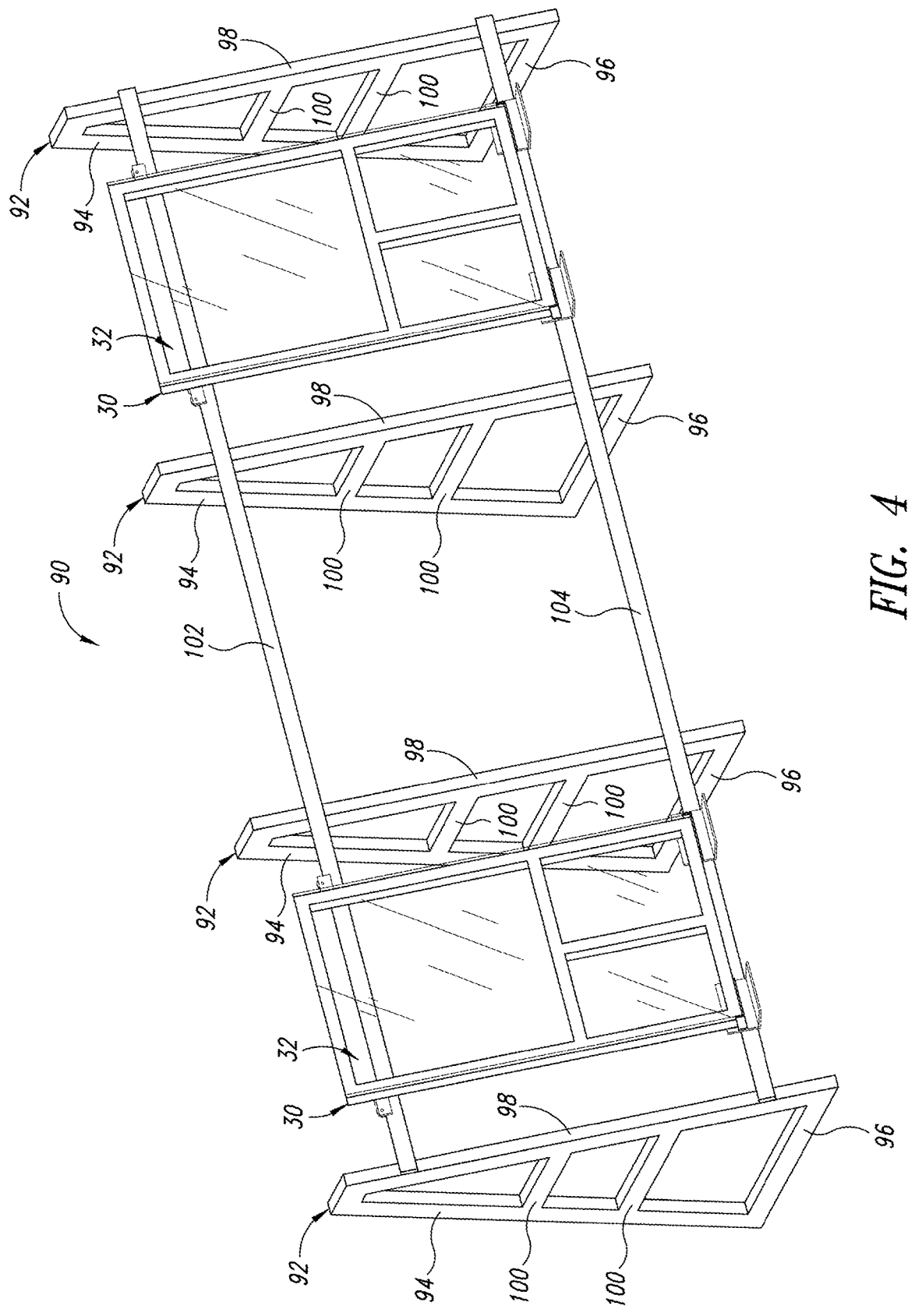
FIG. 4 is an isometric view of a panel processing system having a horizontal processing line that utilizes vertically oriented frames of FIG. 1.

FIG. 4 illustrates a vertical production line 90 for the frame assembly 30 and the panel 32. The production line 90 has upright supports 92, each upright support 92 having an upright bar 94, a horizontal bar 96 extending from a bottom of the upright bar 94, and an angled support bar 98 connecting a far end of the horizontal bar 96 to the top of the upright bar 94, horizontal braces 100 extend between the upright bar 94 and the angled support bar 98. Preferably the angled support bar 98 is at an acute angle from vertical of 5 degrees to 7 degrees, which will assist in keeping the frame assembly 30 on the production line 90. The upright supports 92 hold an upper rail 102 and a lower rail 104 in spaced parallel relationship.

Figure 5:
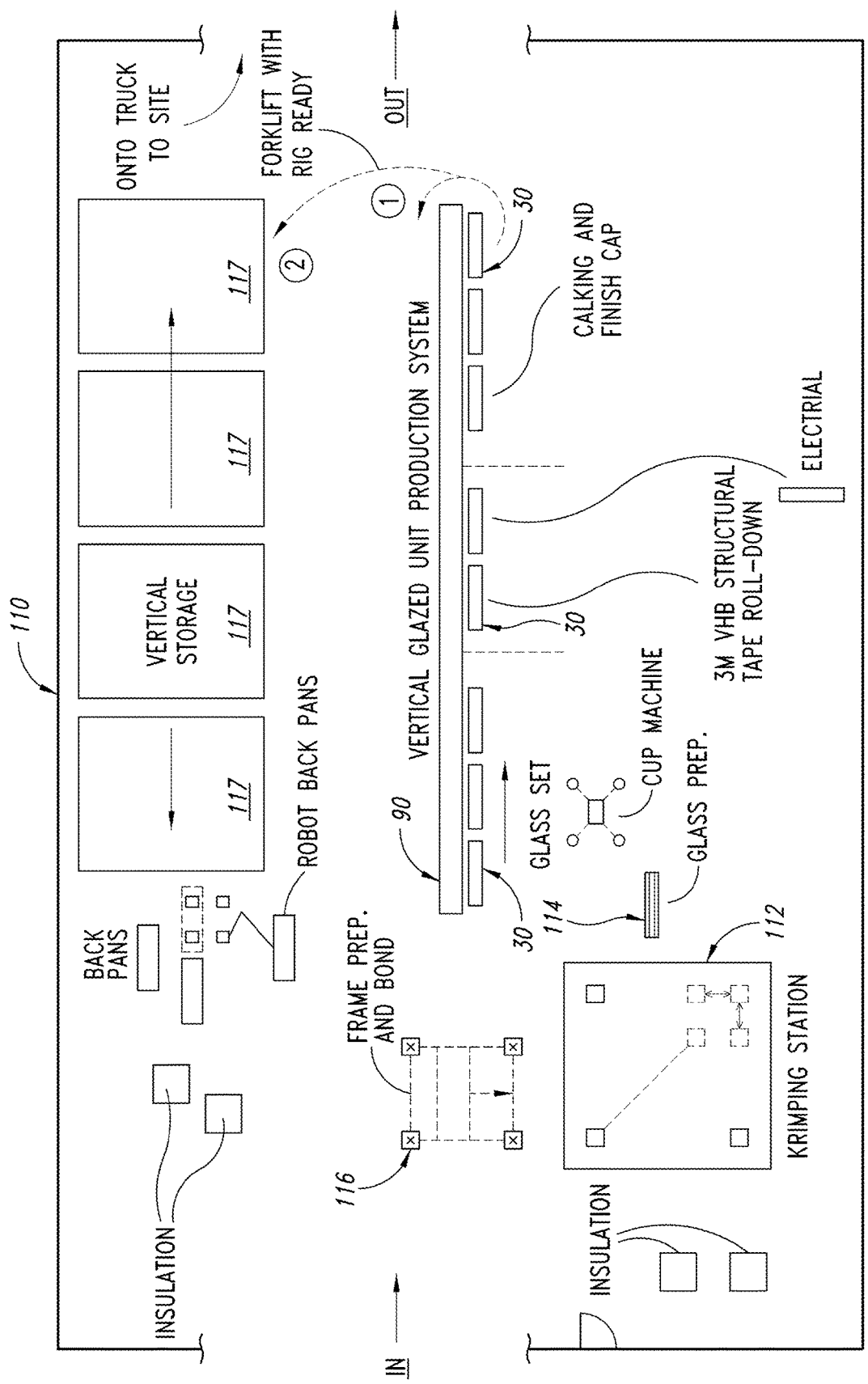
FIG. 5 is a top plan view of the panel processing system of FIG. 4.

FIG. 5 illustrates an entire panel processing system 110 to include the vertical production line 90, a crimping station 112, a glass prep station 114, a frame preparation and bonding station 116, and vertical storage racks 117, along with other features denoted thereon.

Figure 8A:
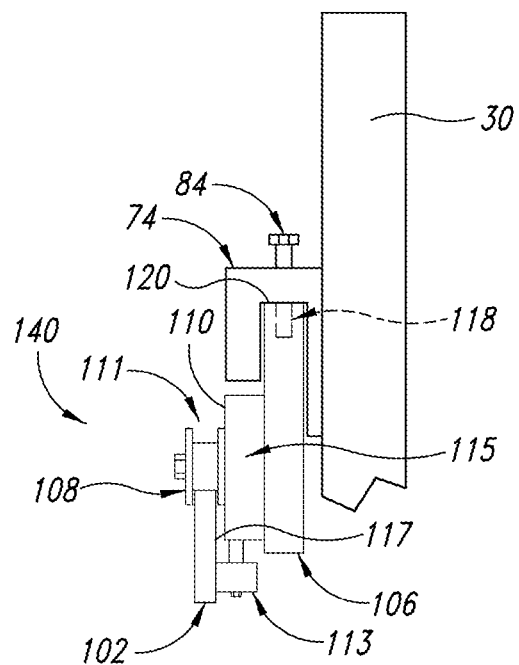
FIGS. 8A and 8B are side views of the upper and lower carrier assemblies of FIG. 6.
Figure 8B:
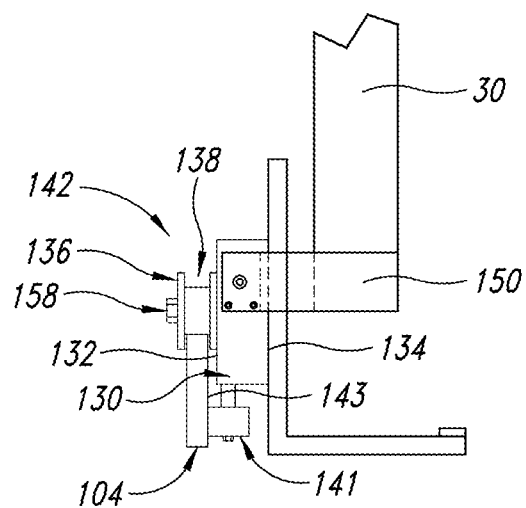

FIGS. 6 and 7 illustrate upper and lower carriers 140, 142 respectively, supported on the respective upper and lower rails 102, 104. FIGS. 8A and 8B are side views of these carriers 140, 142 respectively, showing additional details. The upper carrier 140 has a substantially planar, rectangular body 106 with a pair of wheels 108 extending from a back side 110 of the body 106. Each wheel has a channel 111 sized and shaped to ride over the upper rail 102 and to be retained thereon in a known manner. A stabilizer roller 113 extends from a mounting block 115 on the body 106 and rolls against a face 117 of the upper rail 102 to stabilize the upper carrier 142. The body 106 has a threaded opening 118 in a top surface 120 that is sized and shaped to receive the threaded bolt 84 from the hook 74, which retains the frame assembly 30 in positive and fixed engagement with the upper carrier 140.

FIGS. 7 and 8B illustrate the lower carrier 142 that includes a first body 130 and second body 131, each having front and back surfaces 132, 134 respectively. A wheel 136 extends from the back surface 134 of each of the first and second bodies 130, 131, and has a channel 138 sized and shaped to fit over the lower rail 104. A stabilizer roller 141 extends from a lower surface of the bodies 130, 131 and rolls against a front face 143 of the lower rail 104 to stabilize the carrier 142.

An L-shaped lower plate 144 is attached to the first and second bodies 130, 131, preferably at an upright plate 146, with a lower horizontal plate 148 extending forward towards and projecting under the frame assembly 30. A pair of first and second side stops 150, 152 extends forward from the pair of bodies 130, 131, respectively, and are sized, shaped, and positioned to provide lateral stability to the frame 30. A horizontal bar 154 extends across a front face 156 of the upright plate 146 between the first and second side stops 150, 152. This is used to secure the axels 158 for the rollers 136.

Figure 9:
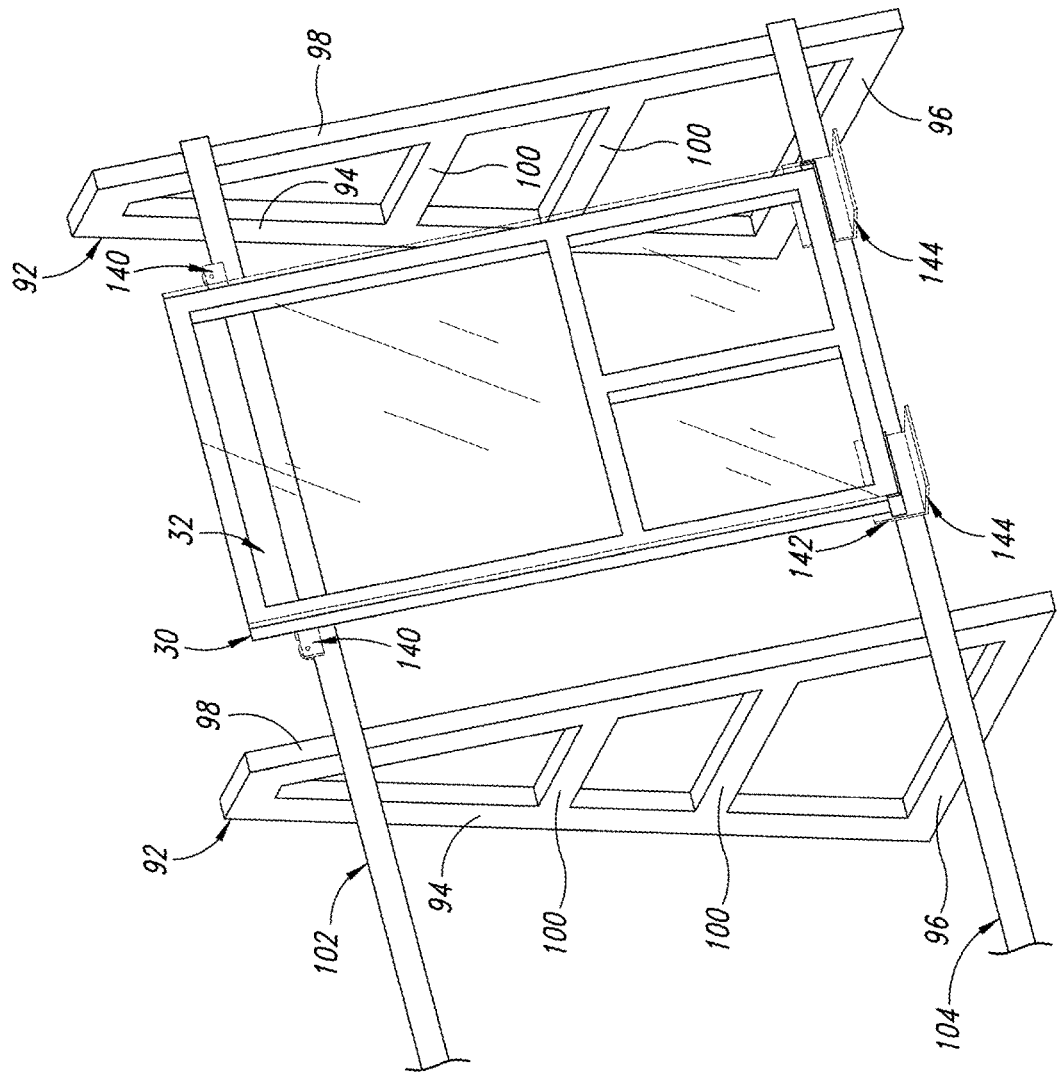
FIG. 9 is an enlarged isometric view of the frame assembly mounted on the upper and lower carrier assemblies.
Figure 10:
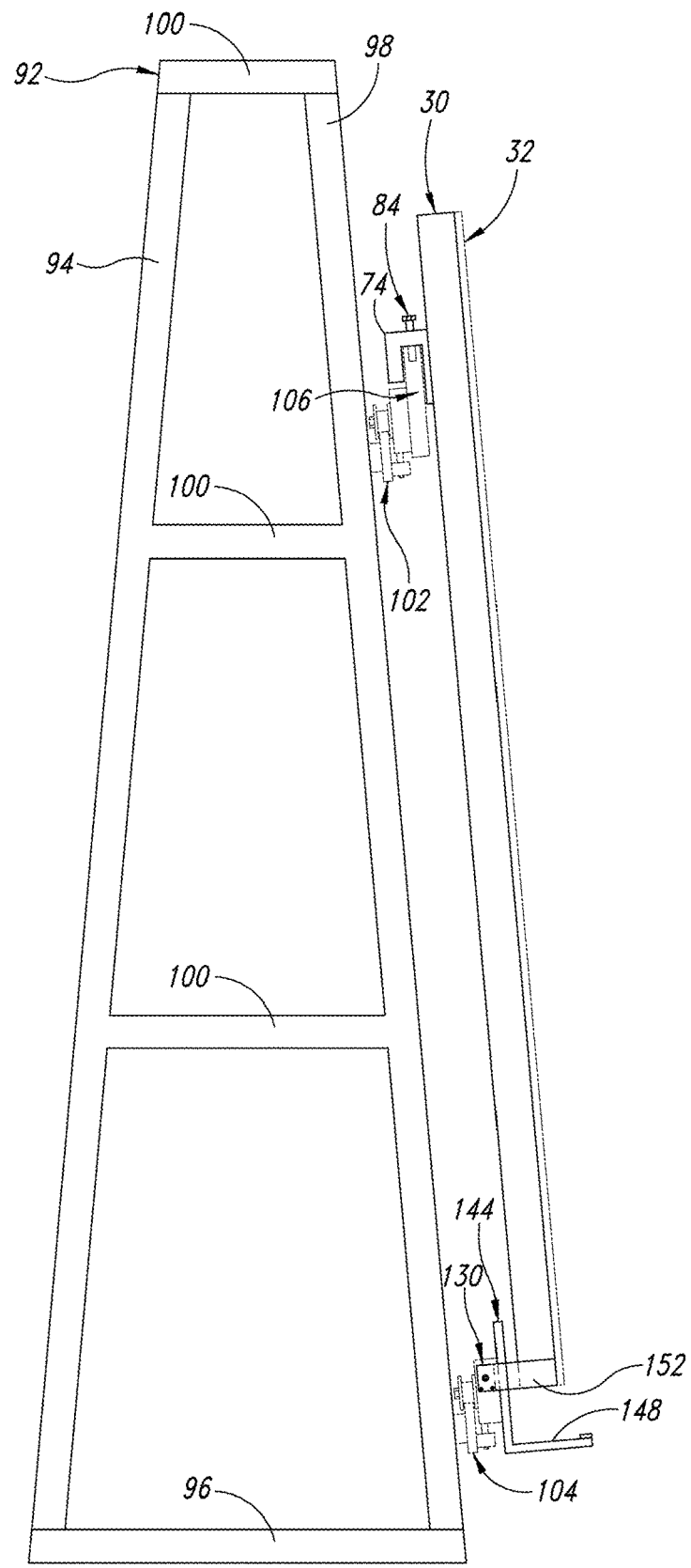
FIG. 10 is a side elevation view of the frame assembly mounted on the upper and lower carrier assemblies of FIG. 9.

FIGS. 9 and 10 illustrate the frame assembly 30 with the panel 32 affixed thereto. When the panel 32 is formed of glass intended for the exterior of a building, such as a high rise office building, the panel 32 is preferably attached to the frame assembly 30 with high-bond glazing tape. Alternatively, a shoulder may be formed on the front face of the frame 30 and the panel 32 sits snug within the shoulder, where it is held in place with the glazing tape. An optional cap on the front face of the frame 30 may be used to secure or aid in securing the panel 32 to the frame 30. Because these attachment methods are well known in the industry, they will not be described in detail herein. Because a very high bond (VHB) tape is used to secure the panel to the frame, it achieves 50% of total strength immediately, thus allowing immediate handling of the panel and frame assembly rather than waiting 24 hours for a typical wet bond to reach initial cure.

What follows next is a description of a transport and installation system in FIGS. 11-15 that utilizes a unique pivot cradle assembly 160 for the transport of multiple frame assemblies 30 to the installation site and mounting on a building's horizontal frame members.

Figure 11:
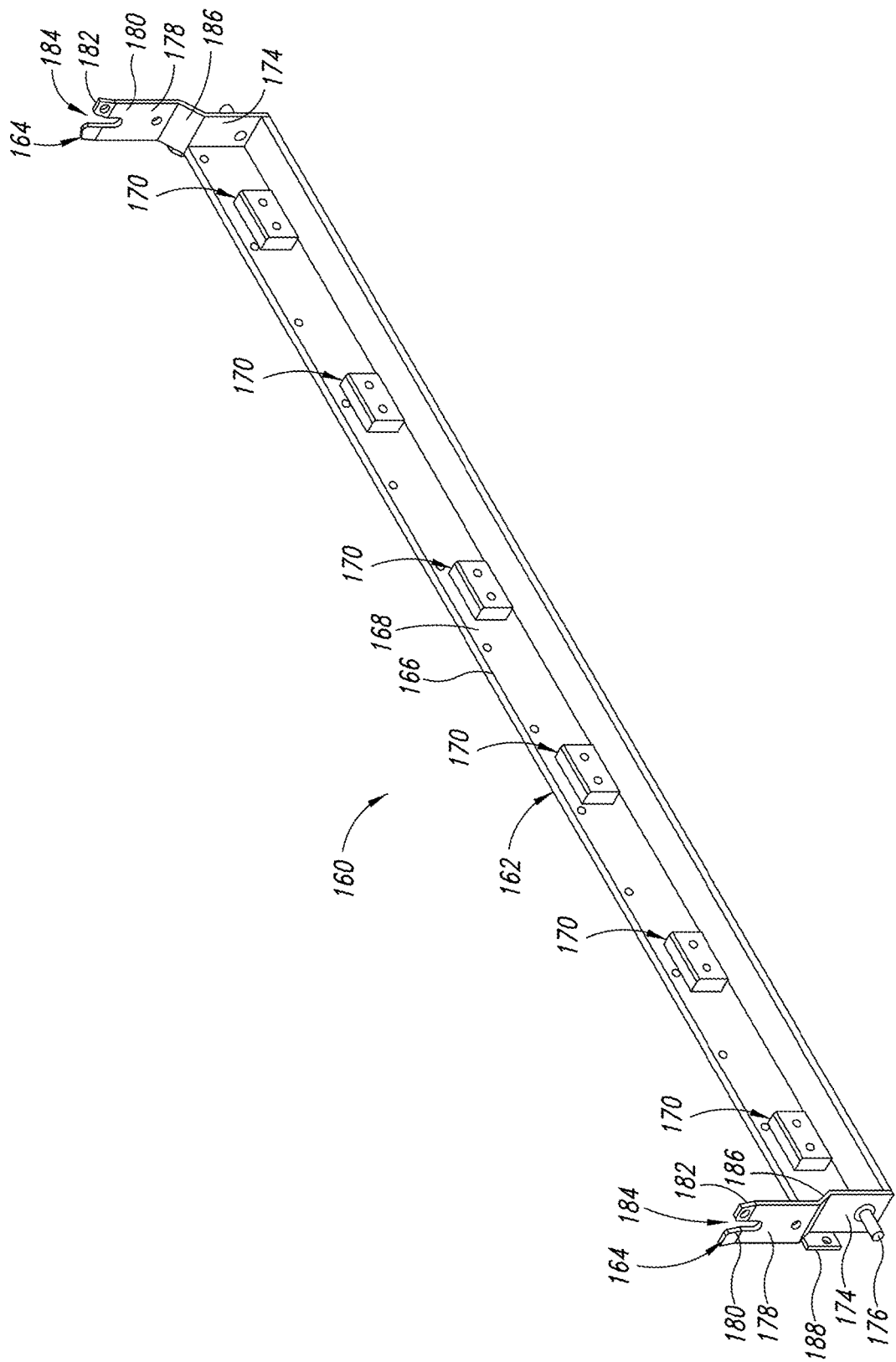
FIG. 11 is an isometric view of a pivot cradle that supports a bottom of the frame assembly when stacked with other frame assemblies in accordance with the present disclosure.

FIG. 11 depicts the pivot cradle assembly 160 that is sized and shaped to attach to the bottom transverse frame member 42 of the frame 30. The cradle assembly 160 includes the longitudinal L-shaped cradle 162 having offset pivot bars 164 attached at each end. The cradle 162 has a first wall 166 that has an interior face 168 with a plurality of pillow blocks 170 in spaced arrangement thereon. Each pillow block 170 has a rectangular shape sized and shaped to fit within an extrusion or channel on the underside of the bottom frame member 42. The pillow blocks 170 can be attached to the first wall 166 using any conventional attachment means, such as adhesive, fasteners, and the like. In a preferred construction, the pillow blocks 170 are made from Delryn® material that is readily commercially available and will not be described in detail herein. A second wall 172 extends at substantially a 90 degree angle from the first wall 166 to form the L-shaped cradle 162.

Each pivot bar 164 has a first plate 174 that is attached to a respective end of the cradle 162 and includes a post 176 extending perpendicularly from the first plate in a direction away from the cradle 162. A second plate 178 is formed to have a U-shaped yoke 180 at a distal end 182 that defines an elongate opening 184 that opens at the distal end 182. The opening 184 is sized and shaped to receive the post 176 from an adjacent pivot bar 164 in slidable engagement as described more fully below. The second plate 178 is attached to the first plate 174 by an intermediate plate 186. The intermediate plate 186 is angled with respect to the first and second plates 174, 178 so that the second plate 178 is offset from the first plate 174 in a spaced parallel relationship. More particularly, the second plate 178 is spaced away from the respective end of the cradle 162 to which the first plate 174 is attached. Each of the first plates 174 include a planar rear face 188 extending orthogonally therefrom to be in spaced parallel relationship with the first wall 166 of the cradle 162 and to extend away from the respective end of the cradle 162 to which the pivot bar 164 is attached.

Figure 12:
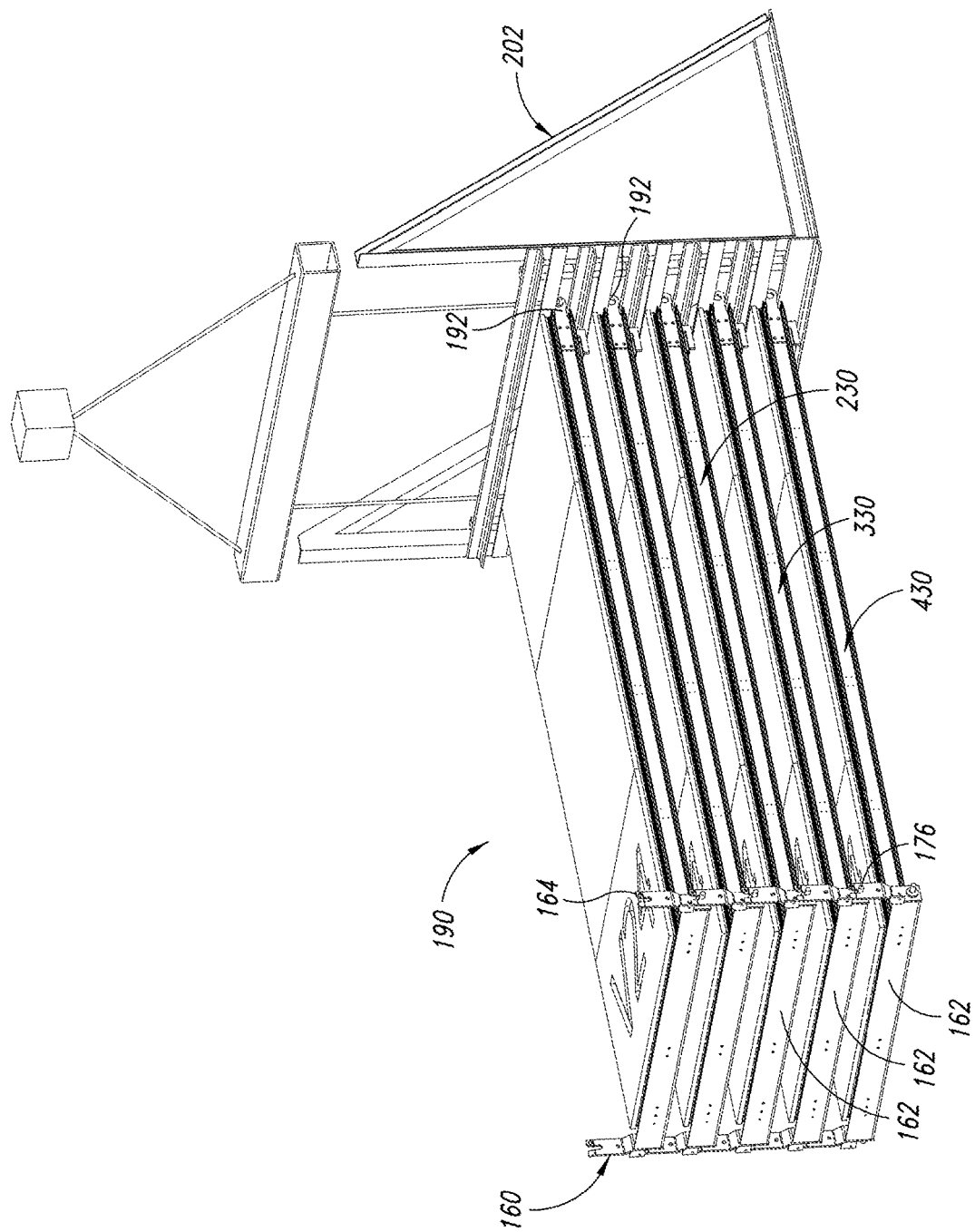
FIG. 12 is an isometric view of multiple frame assemblies in a stacked configuration using the pivot cradle of FIG. 11 in accordance with the present disclosure.

In use, the cradle assembly 160 is placed against the bottom frame member 42 of the frame assembly 30 so the pillow blocks 170 rest within the extrusion of the bottom fame member 42. FIG. 12 shows the cradle assembly 160 attached to respective frame assemblies 30, with the frame assemblies 30 stacked on each other in a planar stack 190 arrangement. The post 176 from an upper frame assembly 230 rests in the elongate opening 184 of the pivot cradle assembly 160 or immediately below it on a lower frame assembly 330. This enables the upper frame assembly to pivot with respect to the lower frame assembly on which it rests. In FIG. 12 a third frame assembly is shown as the bottom frame assembly 430 of the stack 190. As such, the respective panels mounted on each frame assembly 230, 330, 430, and the respective frame assembly 30 to which they are attached are spaced from adjacent panels and frame assemblies to avoid damage or breakage.

Figure 13:
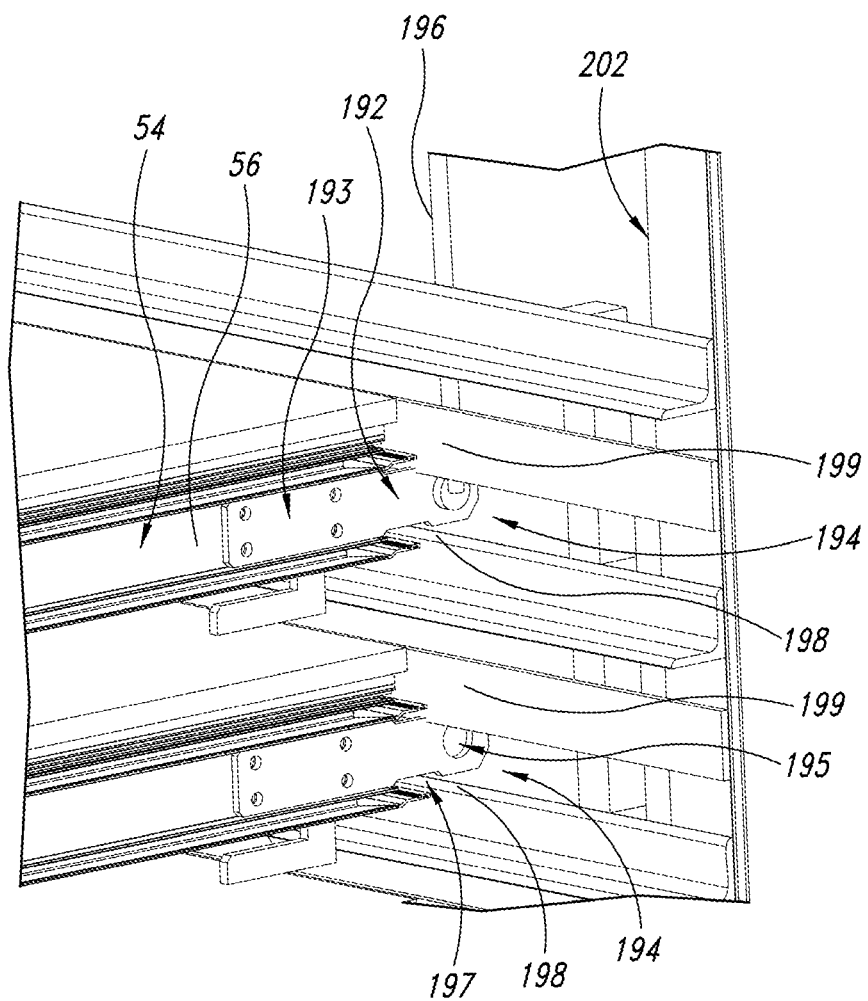
FIG. 13 is an enlarged view of the stacked multiple frame assemblies showing a spigot at the top end of each side frame member of each frame assembly.

As shown more clearly in FIG. 13, at the opposite end of each frame assembly 30 are respective spigots 192 attached to the first end 50 of the first side frame member 48 and the first end 56 of the second side frame member 54. Each spigot 192 has a body 193 sized and shaped for removable attachment to the respective side frame member 48, 54, such as with threaded fasteners. Each spigot 192 has a distal end 194 with an opening 195 sized and shaped to receive a lifting apparatus, such as a cable 196. The distal end 194 also has a notch 197, preferably on both opposing edges, that is sized and shaped to rest on a top edge of a starter frame 198 and to be held from above by a cross-member 199 that is part of a brace 202.

Figure 14:
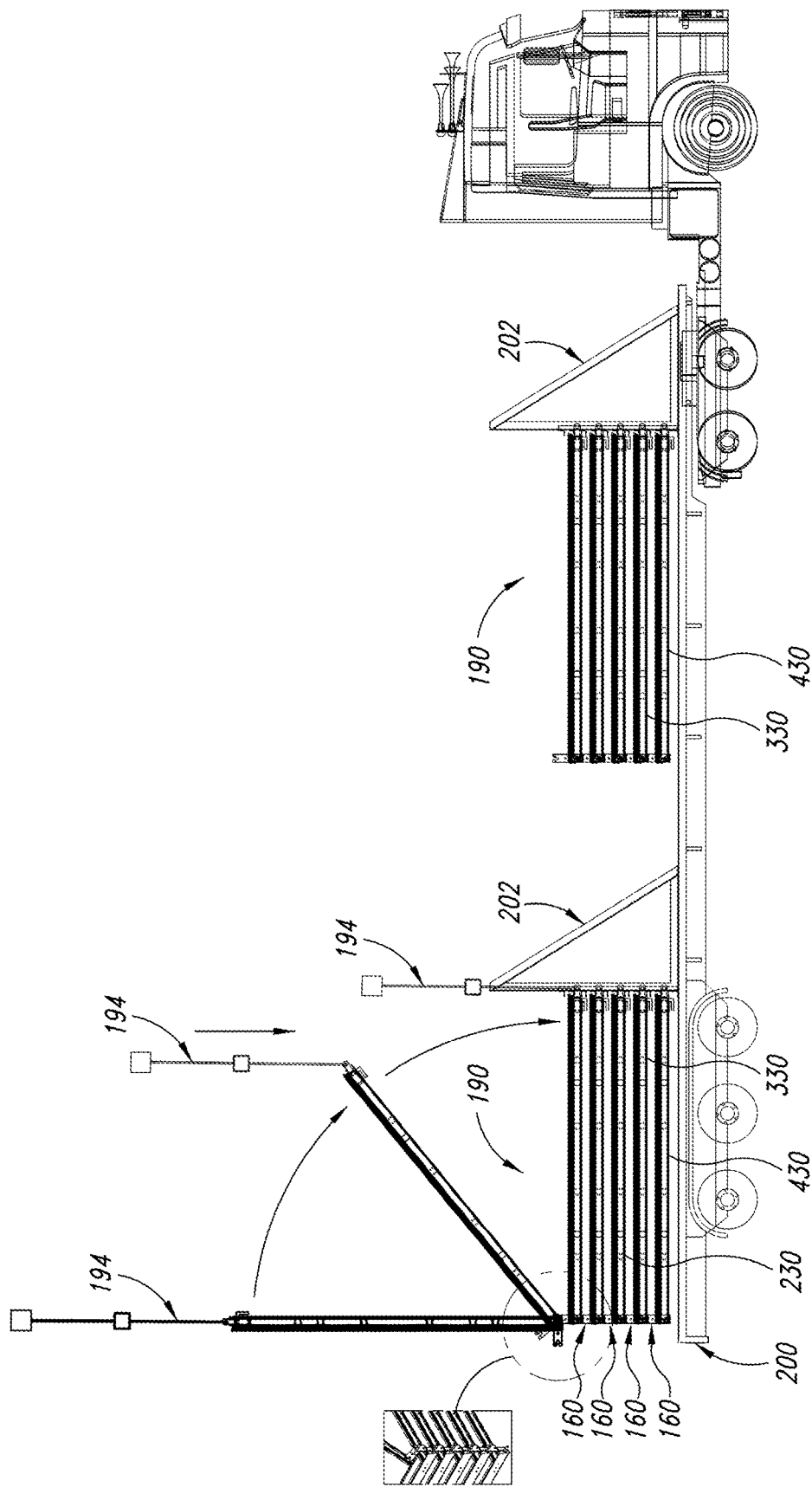
FIG. 14 is a side plan view of the multiple frame assemblies in final position for transport on a delivery vehicle.

FIG. 14 illustrates two stacks 190 of frame assemblies 30 with panels on a trailer 200. Braces 202 are provided at a forward end of each stack 190 to maintain adequate spacing and provide support for each of the stacks 190 while on the trailer 200. The loading process involves lifting each frame assembly 230, 330, 430 of the stack 190 individually onto the trailer. Ideally the frame assemblies 230, 330, 430 are lifted in an upright position as they are positioned on the horizontal processing line and in the storage 117. They are lifted onto the trailer 200 and pivoted into the horizontal position about the pivot cradle assembly 160. The lower frame assembly 430 of the stack can rest directly on the trailer. The subsequent frame assemblies 330, 230, etc., will have the lower ends supported by the pivot cradle assembly 160 and the top end is lowered onto the respective spacers 192 as described above so that the pivot cradle assembly 162 will rotate about the posts 176.

Figure 15:
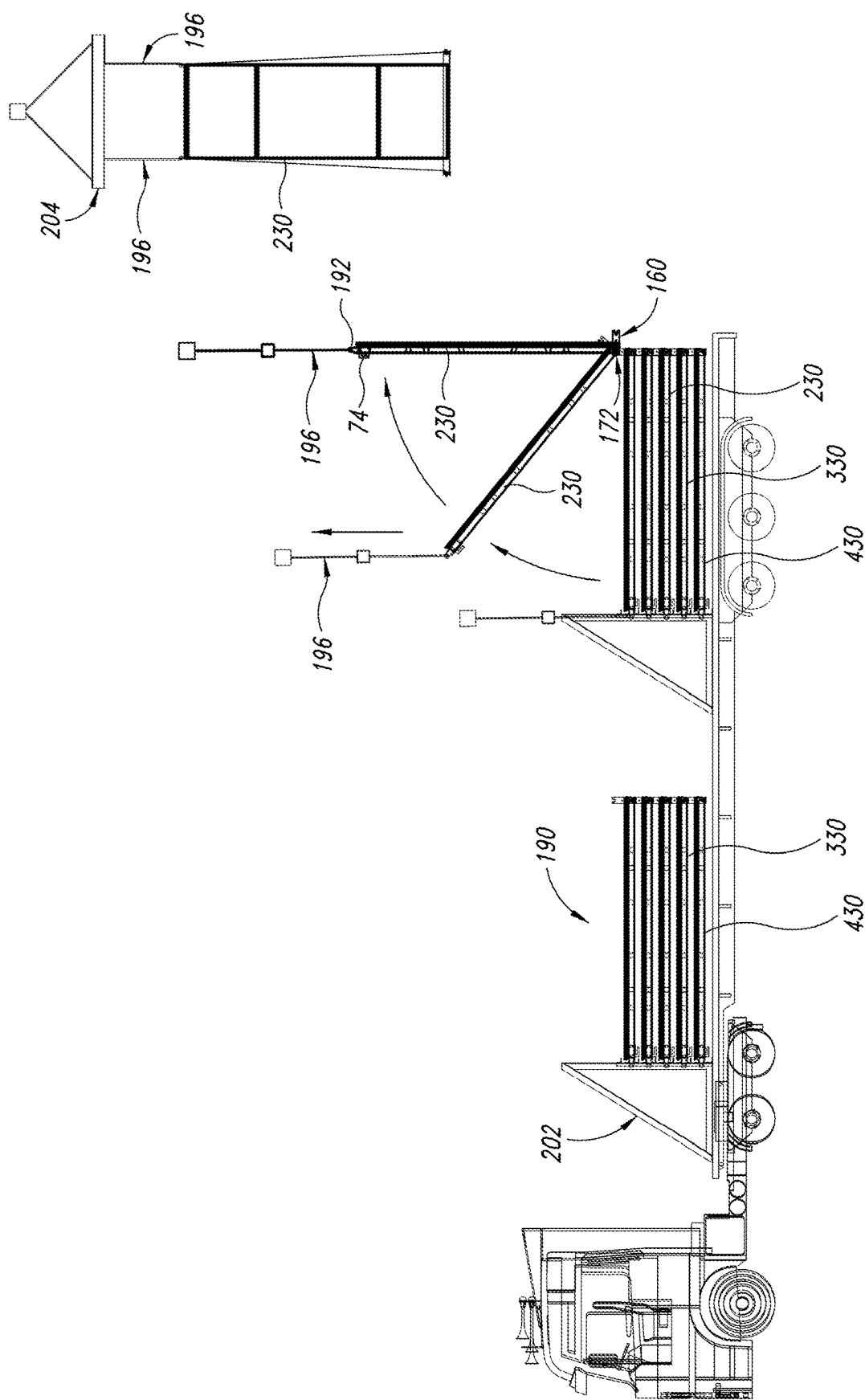
FIG. 15 is a side plan view of the multiple frame assemblies being removed from the delivery vehicle in accordance with the present disclosure.

FIG. 15 illustrates the unloading of the frame assemblies 230, 330, 430 from the trailer 200. Here, a crane (not shown) is attached to the spigot 192 via cables 196 at an upper part of the frame assembly 230 via a spreader 204. The top portion of the frame assembly 230 is raised upward while the bottom transverse frame member 42 with attached pivot cradle assembly 160 pivots about the post 176 resting in the adjacent pivot cradle assembly 160 of the lower frame assembly 330. Once the frame assembly 230 reaches a vertical orientation, it is pulled upward to slide the posts 176 out of the respective openings 184. Once the frame assembly 230 is clear of the adjacent lower frame assembly 330, the pivot cradle assembly 160 is removed from the frame assembly 30 with panel. The spigot 192 can remain in place or be removed, depending on the particular installation requirements.

FIG. 16 illustrates the completed frame assembly 30 with the panel raised into position on an exterior of a building 210. Here, the hooks 74 on each side of the frame assembly 30 are placed over a horizontal frame piece 212 on the building 210. The frame assembly 30 is then secured to the building 210 in a conventional manner.

It will be appreciated from the foregoing that the unique frame assembly 30 described herein with the hook 74 provides a reliable, safe, and convenient method of retaining control over the frame assembly 30 during attachment of the panel 32, movement along the assembly line 90, removal and storage 117, placement on and removal from the trailer 200, and installation on the building 210.

Figure 17:
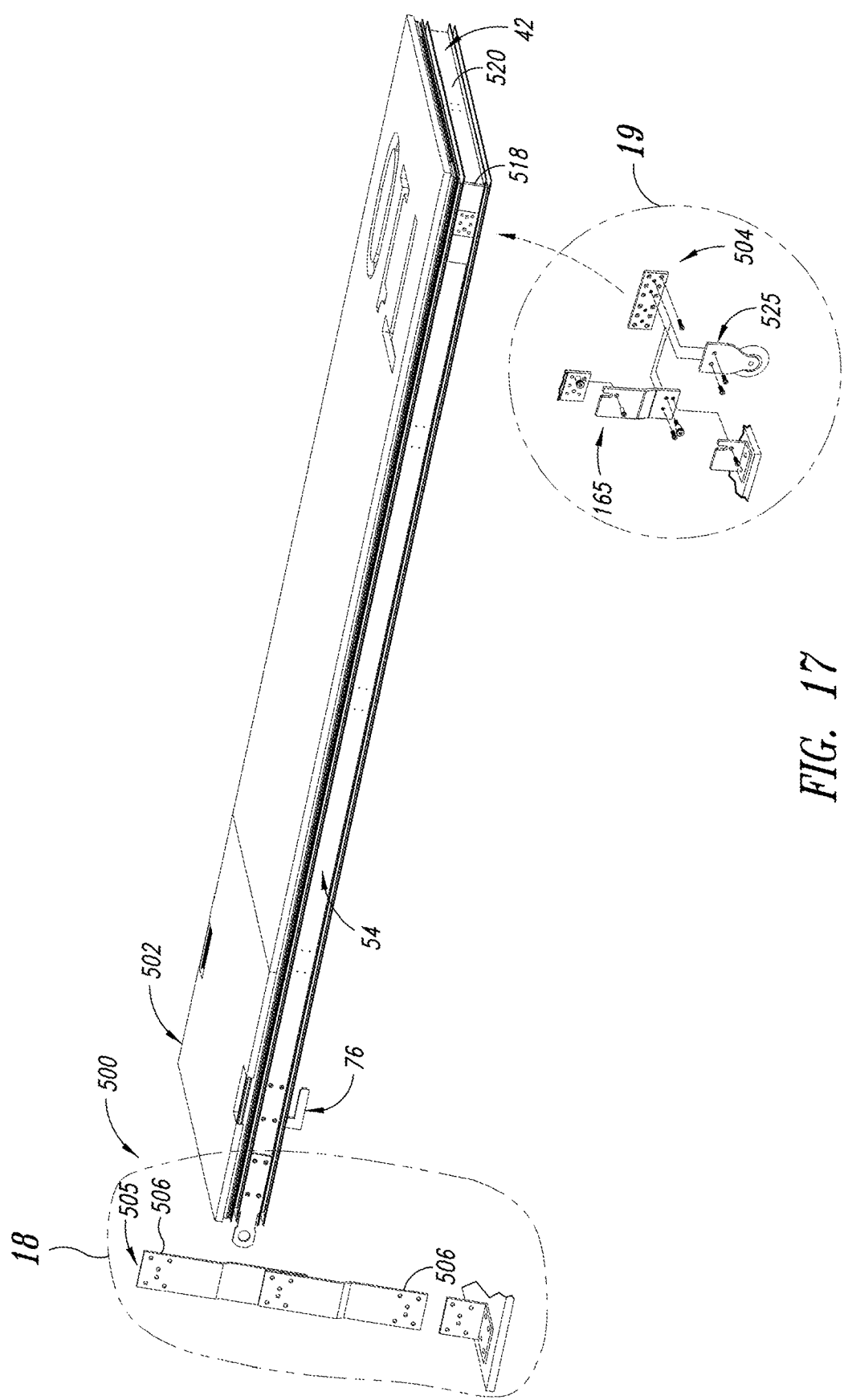
FIG. 17 is a pictorial view of an alternative implementation of the present disclosure showing a mass transport system.

FIGS. 17-21 illustrate further implementations of the present disclosure in the form of a mass transport system 500 having a completed frame and panel assembly 502 with a spigot 192 mounted on the first and second side frame members 48, 54, and a pivot flange 165 positioned to be attached to the bottom end of the first and second side frame members 48, 54 via a respective foundation bracket 504. In FIGS. 17 and 19A-B, only the corner 518 formed by the second side frame member 54 and the bottom frame member 42 is shown. It is to be understood that the description herein applies equally to the opposing corner formed by the first side frame member 48 and the bottom frame member 42, where a similar assembly of a an internal corner cleat, foundation bracket, pivot flange and optional swivel wheel is formed on or attached to the first side frame member 48.

Figure 18A:
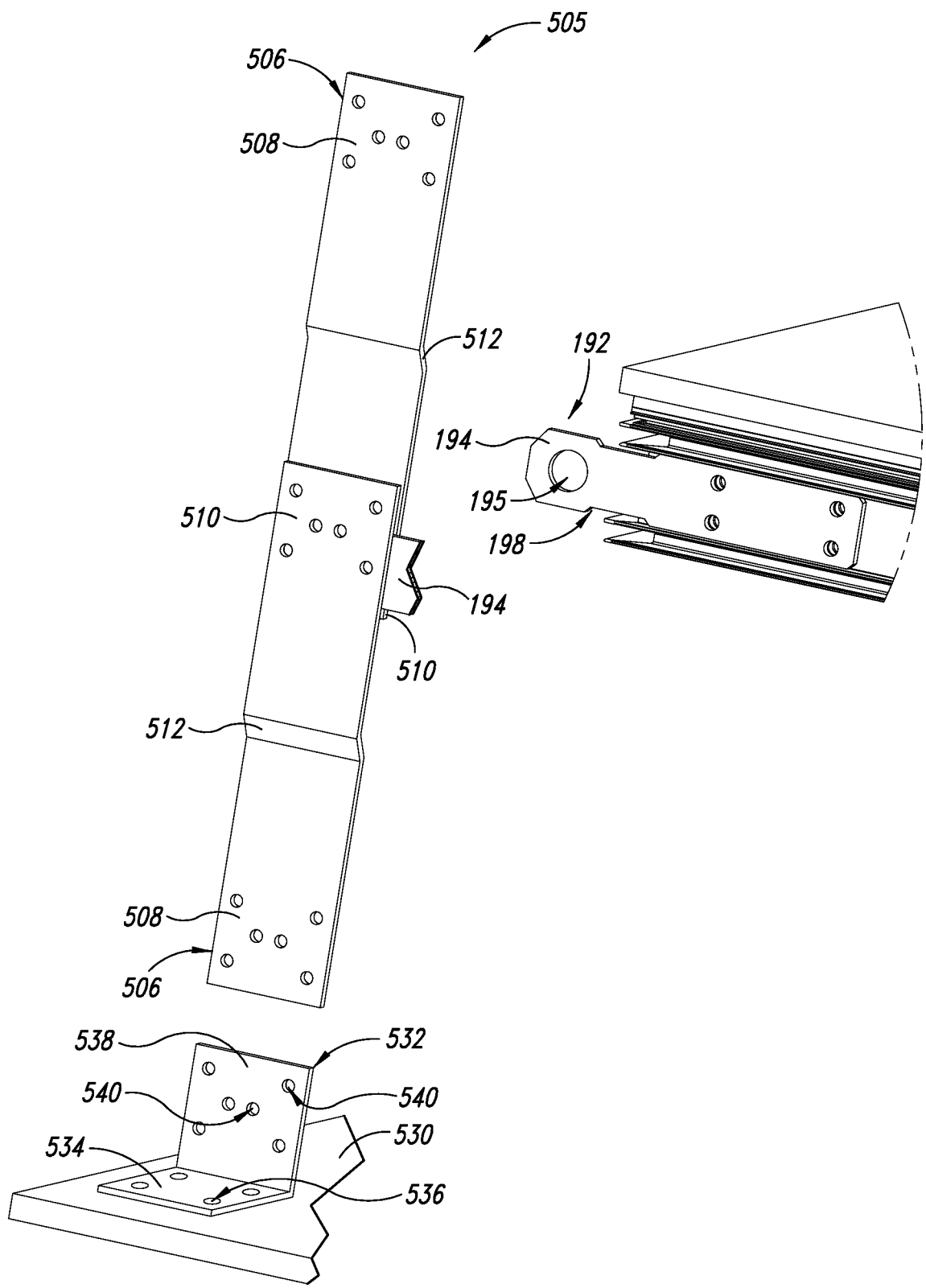
FIG. 18A is an enlarged partial view of spigot clasps at a top end of the frame for the system illustrated in FIG. 17.

At the top end of the panel assembly 502, as shown more clearly in FIG. 18A, is the spigot 192 mounted on the second side frame member 54. The spigot 192 is attached at its distal end 194 to a spigot clasp 505 via the opening 195 in the distal end 194 of the spigot 192. The spigot clasp 505 is formed of two clasp brackets 506 that each have a planar base segment 508 and a planar clasp segment 510 offset from the plane of the base segment 508 by a transition member 512. The two clasp brackets 506 are juxtaposed in reverse orientation so the respective clasp segments 510 are adjacent each other and clasp the distal end 194 of the spigot 192 between them. Suitable removable fasteners or keepers (not shown) that are positioned through two openings in the clasp segments 510 can be used to hold the two clasp brackets 506 together. A third removable fastener or keeper (not shown) can be positioned in a central opening and through the opening 195 in the distal end 194 of the spigot 192 to retain the spigot in removable engagement with the spigot clasp 505. A second spigot (not shown) is attached on the other side of the frame and panel assembly 502 in the same manner as described above.

Figure 18B:
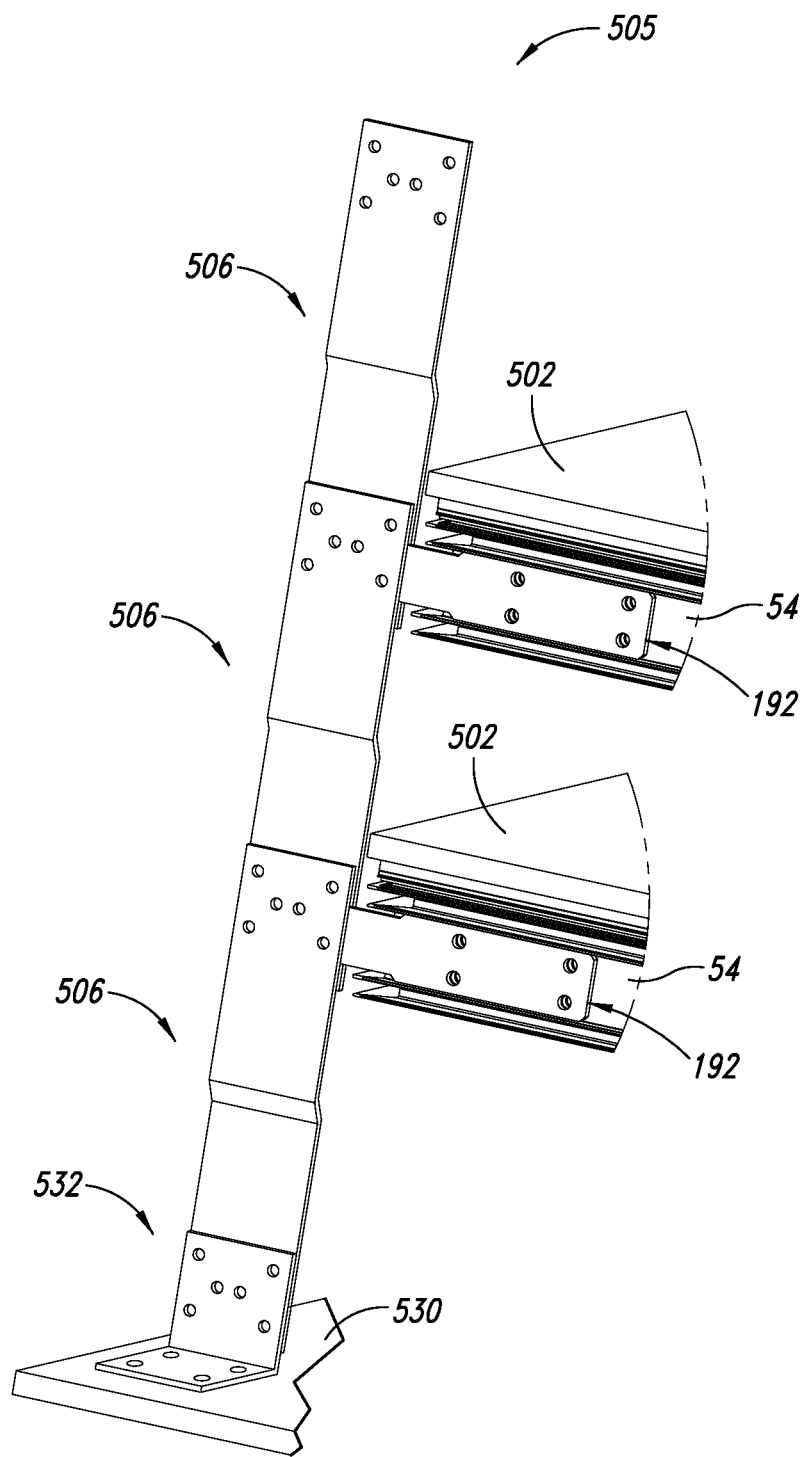
FIG. 18B is an enlarged partial view of spigots of multiple frame assemblies coupled to the spigot clasps illustrated in FIG. 18A in a stacked relationship.

FIG. 18B shows the top end of multiple frame and panel assemblies 502 in a stacked relationship. In other words, FIG. 18B provides more detail of an implementation of a connection at the top end of multiple frame and panel assemblies 502 in a stack of frame and panel assemblies 502, such as the stacks described in further detail with reference to FIGS. 20-21. Specifically, each frame and panel assembly 502 of the multiple frame and panel assemblies 502 has a spigot 192 coupled to the top end of the second side frame member 54 of the frame and panel assembly 502. A second spigot (not shown) is coupled to the top of first side frame member 48 (shown in FIG. 2) of each of frame and panel assembly 502 in the same manner. As shown in FIG. 18A, each spigot clasp 505 is formed of at least two clasp brackets 506 that cooperate together as described above, and these may be chained together to form multiple spigot clasps 505 as shown.

The distal end 194 (shown in FIG. 18A) of each spigot 192 is inserted into a space between the clasp brackets 506 and removably coupled to the clasp brackets 506 by inserting a removable fastener through overlapping openings or through holes in each clasp bracket 506 and a corresponding opening 195 (shown in FIG. 18A) in each spigot 192. The spigot clasp 505 is coupled to a support 530, which may be a truck bed, for example.

Figure 19A:
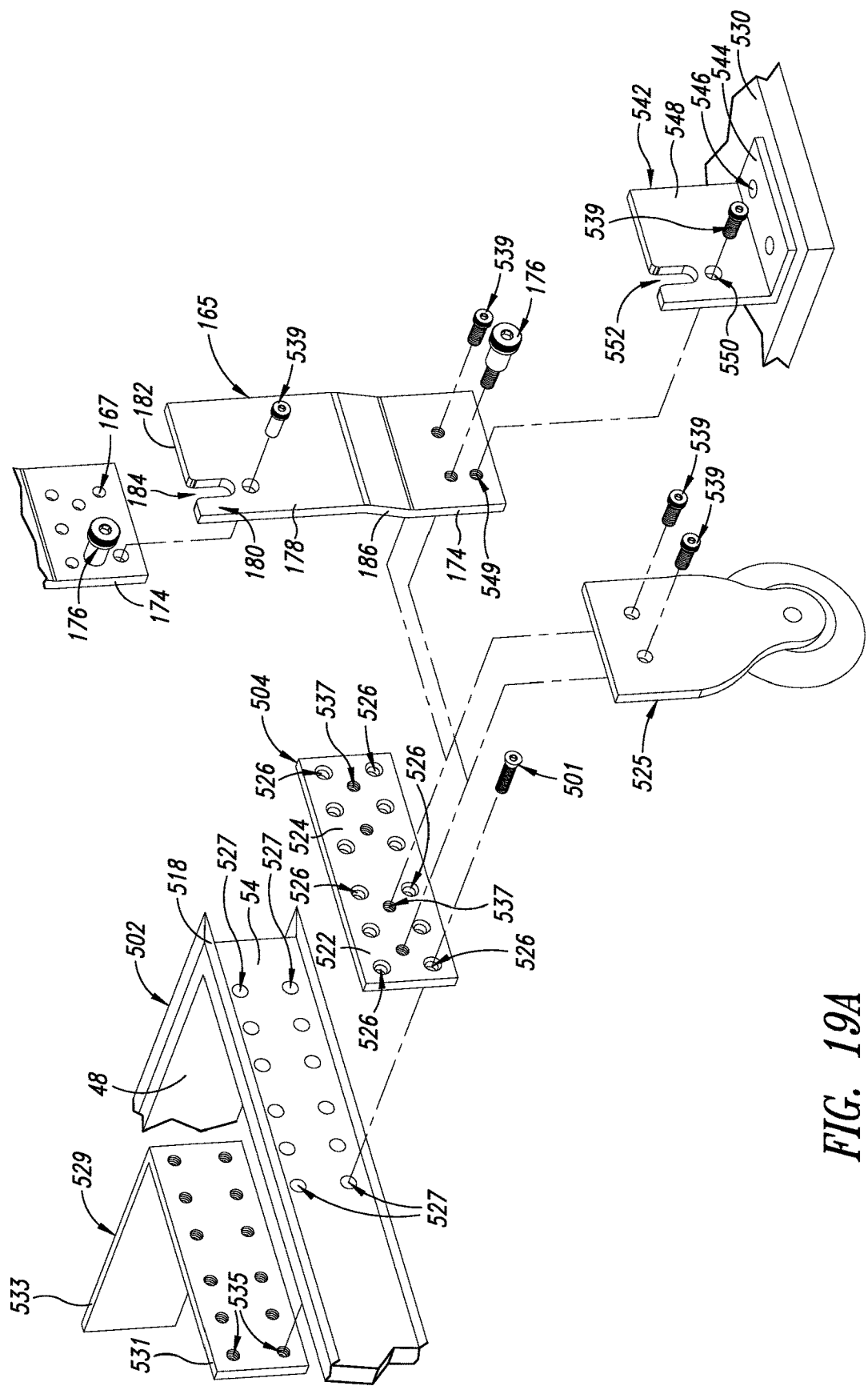
FIG. 19A is an exploded, enlarged view of an assembly consisting of an internal cleat, a lower corner of the frame assembly, a foundation bracket, and a pivot flange or optional swivel wheel for use in supporting the bottom end of the frame assembly for the system shown in FIG. 17.

In FIG. 19A is shown an enlarged view of the pivot flange 165 and foundation bracket 504. The pivot flange 165 shares many features in common with the pivot bar 164 described above and differs in a few respects, such as the number and location of openings 167 and the location of the post 176.

During manufacturing of the frame and panel assembly 502, the foundation bracket 504 is attached to or mounted on the bottom end of the first and second side frame members 48, 54 adjacent a corner 518 formed by the first and second side frame members 48, 54 and the bottom frame member 42. Ideally, but not necessarily, it is orthogonal to the bottom frame member 42. In one implementation, the foundation bracket 504 has a rectangular planform shape that is about as wide (the height is shown in FIG. 19A) as the pivot flange 165 and twice as long to form first and second longitudinal halves 522, 524. A plurality of countersunk through-hole openings 526 are formed in the foundation bracket 504 on both halves 522, 524 to accommodate mounting of the foundation bracket 504 to the second side frame member 54.

There are ideally twelve countersunk through-hole openings 526, six adjacent one longitudinal edge and six along the other longitudinal edge and in alignment with each other in the foundation bracket 504, although any number of openings may be used depending on the application. An equal number of through-hole openings 527 are formed in the second side member 54, and similarly on the opposing first side member 48.

In each lower corner 518 of the frame assembly 502 is an internal corner cleat 529 having first and second legs 531, 533 orthogonal to each other and sized and shaped to be received on the interior of each lower corner 518 of the frame assembly 502. It can be welded, adhered with adhesive, affixed with fasteners, or integrally formed as desired. Each internal corner cleat 529 has an equal number and identically spaced threaded openings 535 to receive a threaded fastener 501 for removably affixing the foundation plate 504 to the respective first or second side member 48, 54 on the frame assembly 502. The counter-sunk openings 526 allow the fastener to be received in the counter-sunk portion in order to not interfere with the attachment of the pivot flange 165 or swivel wheel 525 to the foundation bracket 504. The countersunk-openings are preferably tapered to receive a tapered head on a fastener, or it may be an oversized opening to accommodate an internal or external hex head bolt.

Each foundation bracket 504 also includes two pairs of threaded openings or threaded holes 537 that are sized and shaped to receive a threaded fastener 539 and the threaded post 176 for mounting of the pivot flange 165 or the optional swivel wheel 525 to either the first or second half 522, 524 of the foundation bracket 504.

Figure 20:
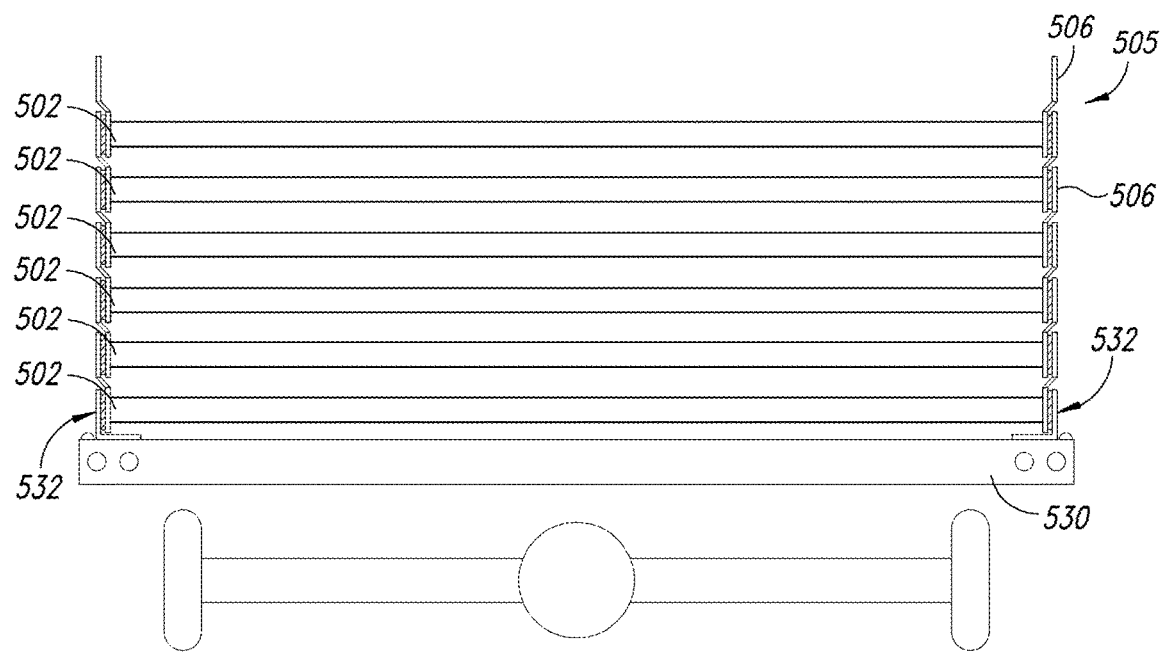
FIG. 20 is a front end view of a stack of frame assemblies secured to a truck or trailer bed.
Figure 21:
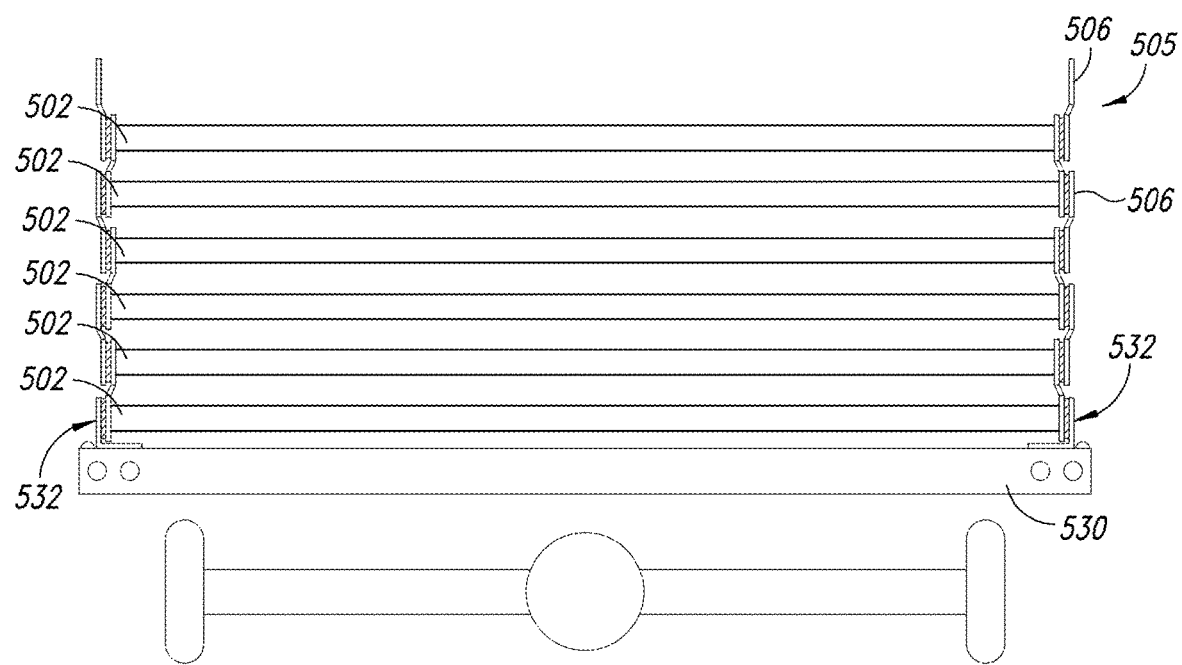
FIG. 21 is an alternative implementation of the present disclosure as viewed from the front end of a stack of frame assemblies secured to the truck or trailer bed.

As will be appreciated from the foregoing, the mass transport system 500 uses a derivative of the pivot cradle technology described above. In this case, the foundation brackets 504 are attached to the first and second frame members 48, 54 with their own fasteners. Then either the pivot flanges 165 or swivel wheels 525 are attached to either the first or second half 522, 524 of foundation brackets 504. Ideally, but not necessarily, the foundation brackets 504 stay with the frame assemblies 502 as part of the racking for transport, movement, and storage of the frame assembly 502, which may be a single frame assembly 502 or in multiples that are stacked as shown in FIGS. 20 and 21.

At the top end of the frame and panel assembly 502 the spigot clasp brackets 506 cooperate with the pivot flanges 165 to create a vertical support lattice for the unitized frame and panel assemblies 502. In other words, this arrangement consists of a lattice of spigot clasps 505 at the top end of the frame and panel assembly 502 and pivot flanges 165 at the bottom end of the frame and panel assembly 502. This stack of frame assemblies 502 can be stored in a variety of locations on the job site, and may be lifted up to the installation floor, where the stack will eventually be separated so that individual frame and panel assemblies can be installed as necessary to meet the requirements of the job.

In the case of separating the frame and panel assemblies from the stack, once a single frame assembly 502 is separated from the stack and moved into position on the floor for "flying" out onto the building face, the pivot flanges 165 are removed and can be replaced with roller wheels 525 (bolted to the same foundation brackets 504 on first and second side frame members 48, 54 as the pivot flanges 165) to support and guide the bottom end of the frame assembly 502 along the floor (or along pre-positioned tracks distributed locally on the floor). In this way, the bottom end of the frame assembly 502 is supported and stabilized as the top end—hung by the spigots 192—is guided to outside the building opening and lifted upward to a vertical hanging position. Finally, the frame assembly 502 is lowered, in close proximity to the building, and the frame assembly's support hooks 74, 76 engage with receivers on the building structure, thus securing the frame and panel assembly 502 in place and closing in part of the building shell.

Figure 19B:
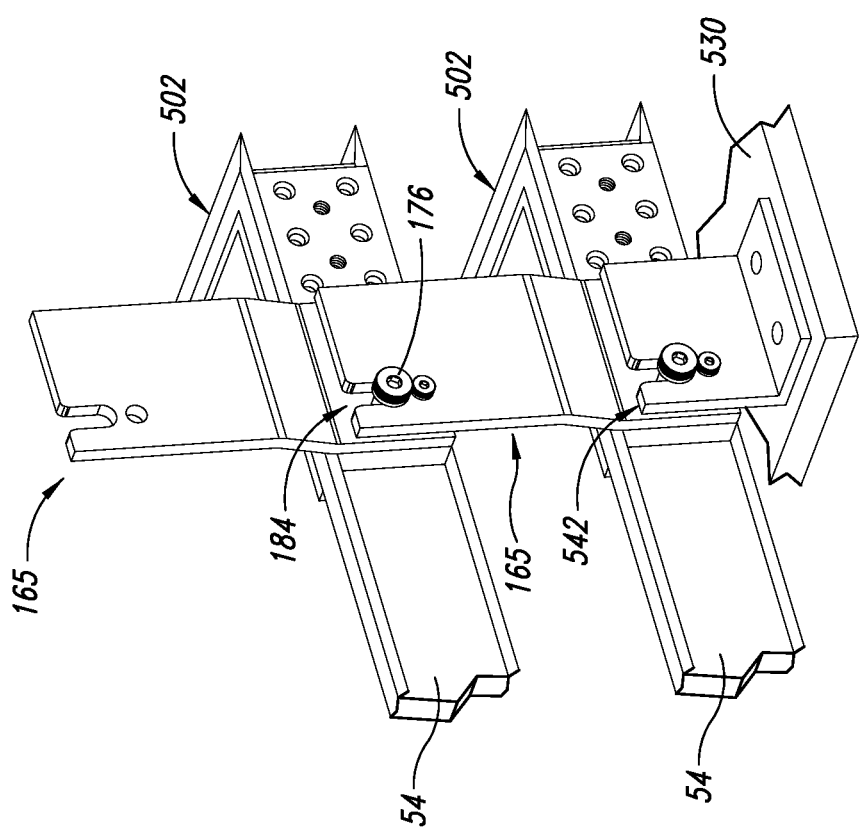
FIG. 19B is an enlarged partial view of the pivot flange illustrated in FIG. 19A of multiple frame assemblies in a stacked relationship.

FIG. 19B illustrates an embodiment of a connection between the bottom end of multiple frame and panel assemblies 502 arranged in a stacked relationship, such as to form a stack described below with reference to FIGS. 20-21. Each frame and panel assembly 502 includes a first pivot flange 165 coupled to the bottom end of the second side frame member 54. A second pivot flange 169 is coupled to the bottom end of the first side frame member 48 (shown in FIG. 2) in a similar manner. Each of the first pivot flanges 165 are structured to engage a vertically adjacent pivot flange 169 when multiple frame and panel assemblies 502 are in a stacked relationship, as shown. Specifically, each pivot flange 165, 169 includes a post 176 that is received in an elongate opening 184 of a vertically adjacent pivot flange 165, 169. The post 176 permits pivoting of the respective attached frame and panel assembly 502 (e.g., the frame and panel assembly 502 and pivot flange 165 engaged with an adjacent frame and panel assembly 502 and second pivot flange 169) relative to an adjacent frame and panel assembly 502 of the multiple frame and panel assemblies 502 when the attached frame and panel assembly 502 is raised or lowered relative to the stack of frame and panel assemblies. For example, the upper frame and panel assembly 502 pivots about the post 176 relative to the lower frame and panel assembly 502 when the top end of the upper frame and panel assembly 502 is lifted off the stack. Similarly, the upper frame and panel assembly 502 pivots about the post 176 in the elongate opening 184 when it is lowered onto the stack. The lowermost pivot flange 169 is coupled to a pivot flange attachment bracket 542 with various fasteners. The pivot flange attachment bracket 542 is coupled to a support 530, such as a truck bed, for example.

With reference to FIGS. 18B and 19B, the embodiments of the panel and frame assemblies 502 described herein include spigot clasps 505 and pivot flanges 165 structured to cooperate with respective adjacent spigot clasps 505 and pivot flanges 165 to enable stacking of the respective attached frame and panel assemblies 502 in a horizontal orientation (e.g., to form a vertical stack of horizontally aligned frame and panel assemblies 502) and removal of the frame and panel assemblies 502 therefrom.

FIGS. 17-21 also show additional aspects of the transportation system 500, including attachment points for securing the frame assemblies 502 to a truck or trailer bed 530. At one end a spigot clasp attachment bracket 532 is provided that includes a base 534 to be attached to the bed 530, such as with fasteners (not shown) positioned in attachment holes 536, and an upright wall 538 with openings 540 for attachment to the spigot clasp 505 via fasteners (not shown).

Similarly, at the other end of the bed 530 is a pivot flange attachment bracket 542 having a base 544 with openings 546 for fasteners (not shown) to attach to the bed 530, and an upright wall 548 with an opening 550 for releasable attachment to a threaded opening 549 in the pivot flange 165 with a threaded fastener 539. The upright wall 548 also includes a U-shaped opening 552 at its top edge to slidably receive the post 176 on the pivot flange 165. The post 176 cooperates with the U-shaped opening 552 to rotate about its longitudinal axis while in the U-shaped opening, thus facilitating the lifting of the other end of the frame assembly 502 and pivoting into an upright position for removal and vice-versa.

A stack of frame assemblies 502 is shown secured to the bed 530 in the end view of FIG. 20, which in this case would be the front of the bed 530. As can be seen, the lowest spigot clasps 505 are attached to the spigot attachment brackets 532 in a first orientation, and the additional stacked spigot clasps are placed on top of each other in the same orientation so that the vertical stack of spigot clasps 505 remain in a straight line. So long as the orientation of each stacked spigot clasp 50 is the same as adjacent spigot clasps, the stack will remain vertical. Hence, in FIG. 21 the orientation of the spigot clasps 505 is reversed yet the vertical alignment remains. The same is true for the pivot flanges 165 at the other end of the stack of frame assemblies 502.

With the systems disclosed herein, the unitized frame and panel assemblies 502 can be lifted (by tower crane) directly off of the stack on the truck bed, building roof, or ground, with each individual frame assembly 502 pivoting on its set of pivot flanges 165, and "flown" into the desired location on the building's shell.

It is to be understood that while a generally rectangular frame assembly has been illustrated and described, other geometric shaped frames and irregular shaped frames can be utilized.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A support system to support multiple frame and panel assemblies on a support with individual frame and panel assemblies arranged in stacked relationship with other frame and panel assemblies, each frame and panel assembly of the multiple frame and panel assemblies including a frame having first and second side frame members with a top end and a bottom end, and a bottom frame member with first and second ends attached respectively to the bottom end of each of the first and second side frame members, the support system comprising:

first and second pivot flanges capable of attachment to the bottom end of the first and second side frame members, respectively, the first and second pivot flanges structured to engage a vertically adjacent pivot flange when multiple frame and panel assemblies are in stacked relationship and to permit pivoting of stacked frame and panel assemblies relative to one another;

a first spigot structured to be attached to the top end of the first side frame member and a second spigot structured to be attached to the top end of the second side frame member of each frame and panel assembly, each of the first spigot and the second spigot having a distal end;

a spigot clasp structured to be coupled to a support and including a first clasp bracket configured to be removably coupled to a second clasp bracket in overlapping relationship to clasp the distal end of a respective first spigot and the second spigot;
and the spigot clasps and the pivot flanges structured to cooperate with respective adjacent spigot clasps and pivot flanges to enable stacking of frame and panel assemblies in a horizontal orientation and removal of frame and panel assemblies therefrom.

2. The support system of claim 1 further comprising a first foundation bracket and a second foundation bracket capable of attachment to the bottom end of the first and second side frame members respectively and capable of receiving the respective pivot flange in one of two positions on the foundation bracket.

3. The support system of claim 1 wherein the first and second clasp brackets comprise a body having a first planar half and a second planar half that is offset from the first planar half by a first distance, the first and second clasp brackets capable of mating attachment with the respective second planar halves in face-to-face relationship to clasp the distal end of one of the first and second spigots and to bring the first planar halves of each clasp bracket into a coplanar relationship.

4. A system, comprising:
- a first frame and panel assembly including a frame having first and second side frame members with a top end and a bottom end and a bottom frame member with first and second ends attached respectively to the bottom end of each of the first and second side frame members;
- a first pivot flange removably coupled to the bottom end of the first side frame member, the pivot flange having a body, a post extending from the body, and an elongate opening in the body;
- a pivot flange attachment bracket having an elongate opening sized and shaped to removably receive the post of the first pivot flange to enable rotation of the post in the elongate opening of the pivot flange;
- a first spigot removably coupled to the top end of the first side frame member, the first spigot having a distal end; and
- a spigot clasp having a first clasp bracket removably coupled to a second clasp bracket and configured to slidably receive the distal end of the first spigot there between.

5. The system of claim 4 wherein the spigot clasp further comprises a third clasp bracket removably coupled to the second clasp bracket.

6. The system of claim 5 further comprising:
- a second frame and panel assembly including a frame having first and second side frame members with a top end and a bottom end and a bottom frame member with first and second ends attached respectively to the bottom end of each of the first and second side frame members;
- a second pivot flange removably coupled to the bottom end of the first side frame member of the second frame and panel assembly, the second pivot flange including a post; and
- a second spigot removably coupled to the top end of the first side frame member of the second frame and panel assembly, the second spigot having a distal end,
- wherein the second frame and panel assembly is arranged in a stacked relationship relative to the first frame and panel assembly with the post of the second pivot flange removably received in the elongate opening of the first pivot flange and the second spigot removably coupled to the spigot clasp between the second and third clasp brackets.

7. The system of claim 4 wherein the first and second clasp brackets comprise a body having a first planar half and a second planar half that is offset from the first planar half by a first distance.

8. The system of claim 7 wherein the first planar halves of each of the first and second clasp brackets are in a coplanar relationship when the first and second clasp brackets are attached together.

9. A support system to support a stack of individual frame and panel assemblies on a support, each frame and panel assembly having a first end opposite a second end, the support system comprising:
- first and second pivot flanges removably coupled to the second end of each of the frame and panel assemblies;
- first and second pivot flange attachment brackets structured to be coupled to the support, each of the first and second pivot flange attachment brackets structured to be removably coupled to a respective one of the first and second pivot flanges;
- first and second spigots structured to be removably coupled to the respective first ends of each of the frame and panel assemblies; and
- first and second spigot clasps structured to be coupled to the support, each of the first and second spigot clasps including a first clasp bracket structured to be removably coupled to a second clasp bracket, each of the first and second spigot clasps structured to be removably coupled to a corresponding one of the first and second spigots.

10. The support system of claim 9 wherein each of the first and second pivot flange attachment brackets include an elongate opening and each of the first and second pivot flanges include a post sized and shaped to be received in the respective elongate opening of the first and second pivot flange attachment brackets and enable rotation of the post in the respective elongate opening.

11. The system of claim 9 wherein the first and second spigots each include a distal end, the distal end of the first and second spigots configured to be removably coupled between the first clasp bracket and the second clasp bracket of a corresponding one of the first and second spigot clasps.

* * * * *